(12) United States Patent
     Ii

(10) Patent No.: US 11,196,300 B2
(45) Date of Patent: Dec. 7, 2021

(54) POWER TRANSMISSION DEVICE AND POWER TRANSMISSION SYSTEM

(71) Applicant: TDK CORPORATION, Tokyo (JP)

(72) Inventor: Akihiro Ii, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/092,919

(22) Filed: Nov. 9, 2020

(65) Prior Publication Data

US 2021/0152019 A1     May 20, 2021

(30) Foreign Application Priority Data

Nov. 14, 2019  (JP) .............................. JP2019-206041

(51) Int. Cl.
     *H02J 50/12*     (2016.01)
     *H02J 7/00*      (2006.01)

(52) U.S. Cl.
     CPC ........ *H02J 50/12* (2016.02); *H02J 7/007192* (2020.01); *H02J 2310/48* (2020.01)

(58) Field of Classification Search
     CPC ... H02J 50/12; H02J 7/007192; H02J 2310/48

USPC .......................................................... 307/149
See application file for complete search history.

(56) References Cited

U.S. PATENT DOCUMENTS

2017/0313204 A1* 11/2017 Schumann .............. B60L 53/36
2018/0072173 A1*  3/2018 Hwang .................. B60L 53/12
2018/0290551 A1* 10/2018 Jones .................... G05D 1/0088

FOREIGN PATENT DOCUMENTS

JP    2010-268664 A    11/2010
JP    2018-129205 A     8/2018

* cited by examiner

*Primary Examiner* — Alfonso Perez Borroto
(74) *Attorney, Agent, or Firm* — Oliff PLC

(57) ABSTRACT

A power supply circuit supplies AC power to a power-transmitting coil. A power-transmitting coil unit includes the power-transmitting coil and transmits AC power to a power receiving device. The power-transmitting coil unit executes first power transmission and second power transmission in which AC power received by the power receiving device is less than the AC power in the first power transmission and executes the second power transmission before executing the first power transmission.

20 Claims, 18 Drawing Sheets

Fig. 1

FROM CONTROL CIRCUIT 102

POWER TRANSMISSION DEVICE AND POWER TRANSMISSION SYSTEM

CROSS-REFERENCE TO RELATED APPLICATION

This application claims the benefit of Japanese Patent Application No. 2019-206041, filed on Nov. 14, 2019, the entire disclosure of which is incorporated by reference herein.

FIELD

This application relates generally to a power transmission device and a power transmission system.

BACKGROUND

A wireless power transmission technology transmitting (feeding) electric power without using a power cord is receiving attention. The wireless power transmission technology allows wireless transmission (feeding) of electric power from a power-transmitting-side device to a power-receiving-side device. Accordingly, application of the wireless power transmission technology to transportation equipment such as electric trains and electric vehicles, and various products such as consumer electronics, electronic equipment, wireless communication equipment, and toys is expected.

Part of electric members or mechanical members constituting a power transmission system, such as an electrolytic capacitor, requires a certain temperature or higher in order to exhibit performance thereof. Accordingly, the aforementioned electric member or mechanical member may not sufficiently exhibit the performance thereof when used in a state of the temperature of the use environment being too low. Consequently, for example, there is a risk that electric power containing a large number of ripples and a large amount of noise is transmitted from a power-transmitting-side unit to a power-receiving-side unit. In such a case, a part an operating characteristic of which is degraded at a low temperature needs to be heated, and the temperature of the part needs to be raised to a temperature at which the characteristic is kept excellent. For such a purpose, Unexamined Japanese Patent Application Publication No. 2010-268664 discloses a system raising the temperature of equipment being a power-receiving-side device by an electromagnetic field generated at power transmission.

SUMMARY

The system disclosed by Unexamined Japanese Patent Application Publication No. 2010-268664 can raise the temperature of equipment being a power-receiving-side device, such as a power storage device, but cannot raise the temperature of a part in a power-transmitting-side device. Consequently, there is a risk that electric power containing a large number of ripples and a large amount of noise is fed from the power-transmitting side to the power-receiving side, as described above.

The present disclosure has been made in view of the aforementioned problem, and an objective of the disclosure is to enable a rise in the temperature of a part constituting a power-transmitting-side device in a power transmission system wirelessly transmitting electric power.

In order to solve the aforementioned problem, a power transmission device according to an aspect of the present disclosure is a power transmission device wirelessly transmitting electric power to a power receiving device including a power-receiving coil equipped on a moving body and includes:
- a power-transmitting coil unit including a power-transmitting coil and transmitting AC power to the power receiving device; and
- a power supply circuit supplying AC power to the power-transmitting coil, wherein the power-transmitting coil unit executes first power transmission and second power transmission in which AC power received by the power receiving device is less than the AC power in the first power transmission and executes the second power transmission before executing the first power transmission.

Further, in order to solve the aforementioned problem, a power transmission system according to an aspect of the present disclosure includes a power receiving device equipped on a moving body and a power transmission device wirelessly transmitting electric power to the power receiving device, wherein the power transmission device includes:
- a power supply circuit supplying AC power to a power-transmitting coil; and
- a power-transmitting coil unit including the power-transmitting coil and transmitting AC power to the power receiving device, the power receiving device includes:
- a power-receiving coil unit including a power-receiving coil and receiving AC power; and
- a rectifier circuit rectifying AC power received by the power-receiving coil unit, and the power-transmitting coil unit executes first power transmission and second power transmission in which AC power received by the power receiving device is less than the AC power in the first power transmission and executes the second power transmission before executing the first power transmission.

The power transmission device and the power transmission system with the aforementioned configurations can raise the temperature of a member by performing the second power transmission and then can perform the first power transmission.

BRIEF DESCRIPTION OF THE DRAWINGS

A more complete understanding of this application can be obtained when the following detailed description is considered in conjunction with the following drawings, in which:

FIG. 1 is a diagram illustrating a configuration of a power transmission system according to Embodiment 1 of the present disclosure;

DETAILED DESCRIPTION

Figure 2:
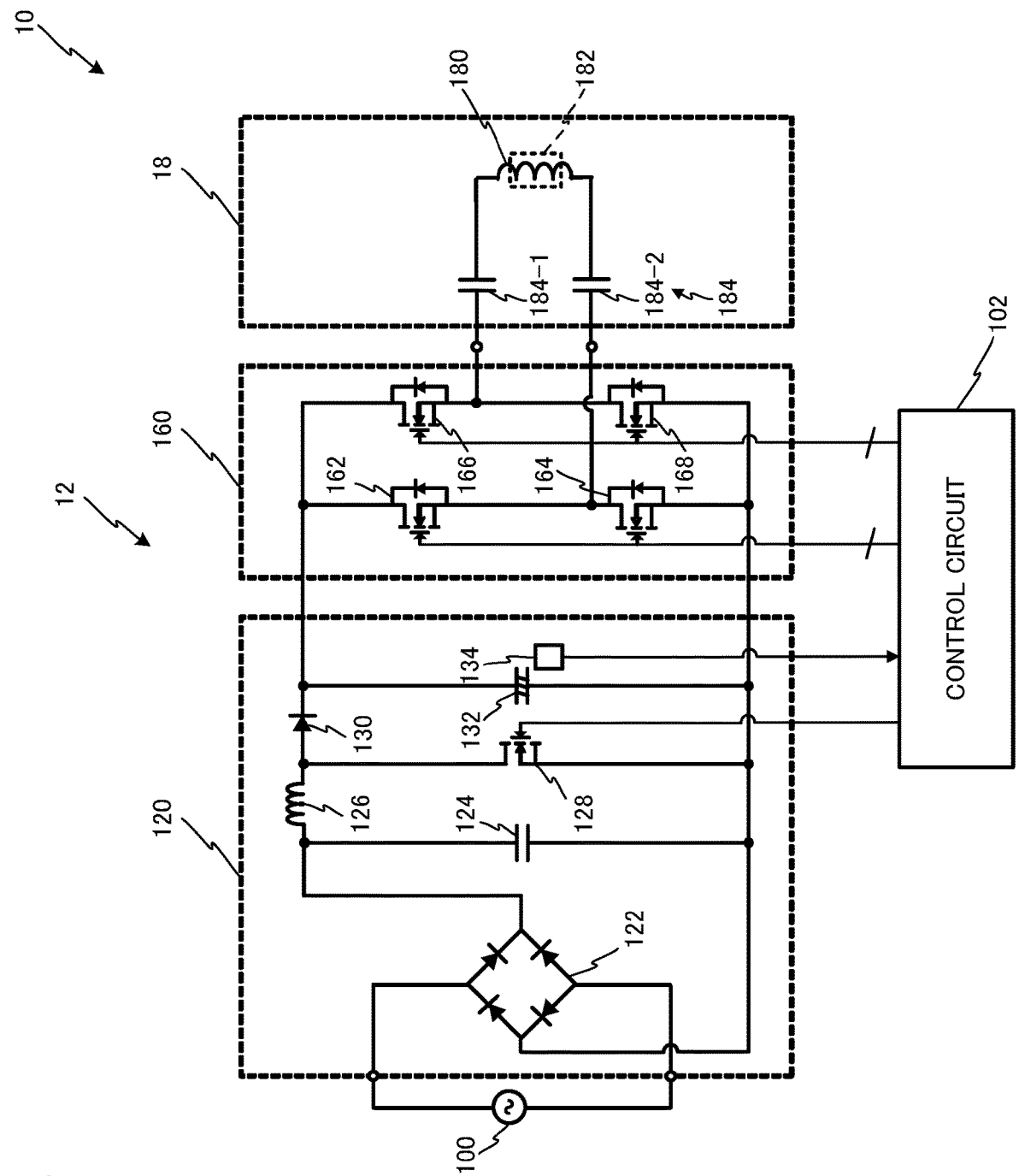
FIG. 2 is a circuit diagram of a power supply circuit and a power-transmitting coil unit in the power transmission system according to Embodiment 1 of the present disclosure.

A power transmission system according to embodiments of the technology according to the present disclosure will be described below referring to drawings. Note that, in the following embodiments, the same components are given the same sign. Further, a ratio between sizes of and shapes of components illustrated in each drawing do not necessarily represent an actual ratio and actual shapes.

Embodiment 1

A power transmission system 1 according to the present embodiment can be used for charging a secondary battery in various devices such as mobile equipment such as a smartphone, an electric vehicle (EV), and industrial equipment. A case of the power transmission system 1 executing charging of a storage battery in an EV will be illustrated below.

Figure 1:
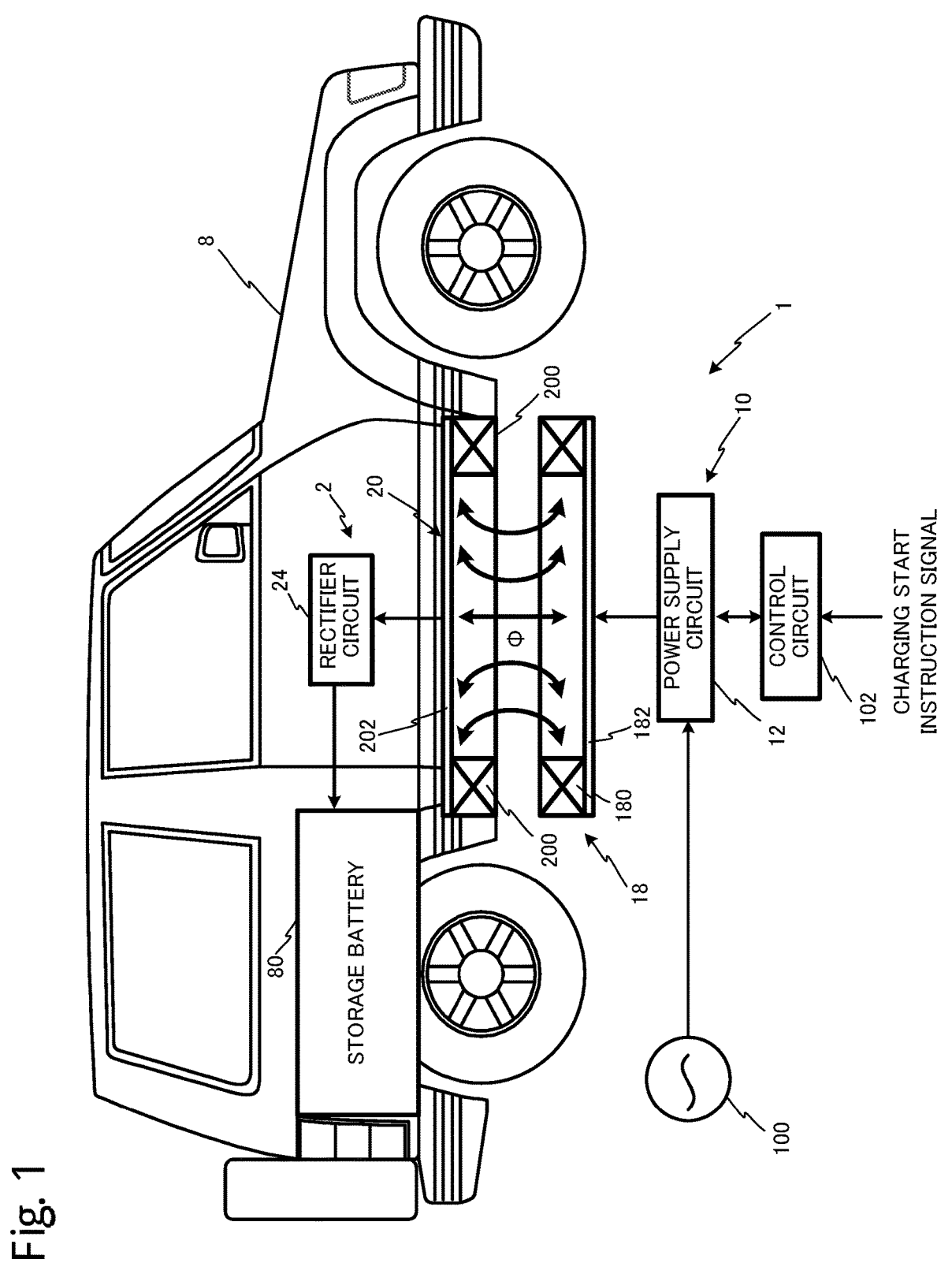

FIG. 1 is a diagram illustrating a configuration of the power transmission system 1 used for charging a storage battery 80 included in an electric vehicle 8. The electric vehicle 8 runs with a motor driven by electric power charged in the storage battery 80 such as a lithium ion battery or a lead storage battery as a power source. The electric vehicle 8 is an example of a moving body in the present disclosure.

As illustrated in FIG. 1, the power transmission system 1 includes a power transmission device 10 wirelessly transmitting (wirelessly feeding) electric power from an AC or DC commercial power source 100 to the electric vehicle 8 and a power receiving device 2 receiving electric power transmitted by the power transmission device 10 and charging the storage battery 80. Note that it is assumed in the following description that the commercial power source 100 is an AC power source.

The power transmission device 10 includes a power supply circuit 12 supplying AC power to a power-transmitting coil unit 18, a control circuit 102 controlling an operation of the power supply circuit 12, and the power-transmitting coil unit 18 transmitting AC power to the electric vehicle 8.

The power supply circuit 12 generates AC power at a frequency within a predetermined range from electric power supplied from the commercial power source 100 and supplies the AC power to the power-transmitting coil unit 18. The control circuit 102 is a device controlling the power supply circuit 12 in such a way that a frequency of AC power supplied to the power-transmitting coil unit in first power transmission to be described later and the frequency in second power transmission to be described later are different from each other. For example, the control circuit 102 controls the power supply circuit 12 in such a way that a frequency $f_d$ of AC power takes a value between 75 kHz and 90 kHz. For example, in response to reception of a charging start instruction signal, the control circuit 102 starts charging of the storage battery 80 by controlling the power supply circuit 12.

The power-transmitting coil unit 18 executes the first power transmission and the second power transmission to be described later. The power-transmitting coil unit 18 includes a magnetic plate 182 made of a magnetic substance such as an iron material or ferrite, and a power-transmitting coil 180 being wound on the magnetic plate 182, being applied with AC voltage, and inducing magnetic flux 1. For example, the power-transmitting coil unit 18 is fixed on a parking lot floor. Further, the frequency $f_d$ of AC power transmitted toward the electric vehicle 8 by the power transmission device 10 can be varied by control over the power supply circuit 12 by the control circuit 102.

The power receiving device 2 is fixed to the electric vehicle 8. The power receiving device 2 includes a power-receiving coil unit 20 receiving AC power transmitted by the power transmission device 10 and a rectifier circuit 24 rectifying received AC power to DC power and supplying the DC power to the storage battery 80. The power-receiving coil unit 20 includes a magnetic plate 202 and a power-receiving coil 200 wound on the magnetic plate 202. The power-receiving coil 200 faces the power-transmitting coil 180 in a state of the electric vehicle 8 stopping at a preset position.

When AC voltage is applied to the power-transmitting coil unit 18 by the power supply circuit 12 in a state of the power-transmitting coil 180 in the power-transmitting coil unit 18 and the power-receiving coil 200 in the power-receiving coil unit 20 facing each other, AC current flows in the power-transmitting coil 180, and the power-transmitting coil unit 18 induces alternating magnetic flux 1. By the alternating magnetic flux Φ being interlinked with the power-receiving coil 200, a counter electromotive force is induced in the power-receiving coil 200. The rectifier circuit 24 rectifies and smoothes the counter electromotive force induced in the power-receiving coil 200 and supplies DC power to the storage battery 80. Further, a charging circuit converting DC power supplied from the rectifier circuit 24 into DC power for charging the storage battery 80 may be included between the rectifier circuit 24 and the storage battery 80.

FIG. 2 is a circuit diagram of the power supply circuit 12 and the power-transmitting coil unit 18. As illustrated in FIG. 2, the power supply circuit 12 includes a power factor improvement circuit 120 improving a power factor of commercial AC power supplied by the commercial power source 100 and an inverter circuit 160 generating AC power supplied to the power-transmitting coil unit 18.

The power factor improvement circuit 120 operates as a boosting converter circuit rectifying and boosting commercial AC power supplied from the commercial power source 100 to DC power in accordance with control by the control circuit 102. The power factor improvement circuit 120 supplies thus acquired DC power to the inverter circuit 160.

The power factor improvement circuit 120 includes a full-wave rectifier circuit 122, a capacitor 124, an inductor 126, a metal-oxide-semiconductor (MOS)-field-effect transistor (FET) 128, a diode 130, and an electrolytic capacitor 132. For example, the electrolytic capacitor 132 is configured with a large-capacity electrolytic capacitor. A characteristic of an electrolytic solution filled in an electrolytic capacitor is affected by temperature. Accordingly, a usable temperature range is defined for an electrolytic capacitor; and there is a risk that a sufficient characteristic may not be acquired when the electrolytic capacitor is used at a temperature equal to or lower than the lower limit of the usable temperature range. While the lower limit of the usable range varies by product, it is assumed here that the lower limit is −20° C. Accordingly, the electrolytic capacitor 132 corresponds to a member the temperature of which needs to be raised when the temperature is lower than −20° C.

Then, when the temperature of the electrolytic capacitor 132 is lower than −20° C., it is required to raise the temperature of the electrolytic capacitor 132 to a temperature equal to or higher than −20° C. before charging the storage battery 80. For this purpose, prior to power transmission for charging, the power transmission system 1 causes the power transmission device 10 to generate heat and raise the temperature of the electrolytic capacitor 132. A method of causing the power transmission device 10 to generate heat by use of loss caused by power transmission in which AC power received by the power receiving device 2 is reduced by decreasing efficiency of power transmission from the power-transmitting coil unit 18 to the power-receiving coil unit 20 is employed in the present embodiment.

The power transmission device 10 includes a temperature detection circuit 134 detecting the temperature of the electrolytic capacitor 132. For example, the temperature detection circuit 134 includes a thermistor installed in the neighborhood of the electrolytic capacitor 132 and detects a temperature measured by the thermistor as the temperature of the electrolytic capacitor 132. Measuring temperature is hereinafter referred to as detecting temperature as appropriate. The temperature detection circuit 134 is an example of a temperature detector in the present disclosure.

The inverter circuit 160 is configured with a full-bridge circuit including N-channel power MOS-FETs 162, 164, 166, and 168. The inverter circuit 160 converts DC power supplied from the power factor improvement circuit 120 into AC power by the N-channel power MOS-FETs 162, 164, 166, and 168 being turned on and off in accordance with control by the control circuit 102 and supplies the AC power to the power-transmitting coil unit 18.

Figure 3:
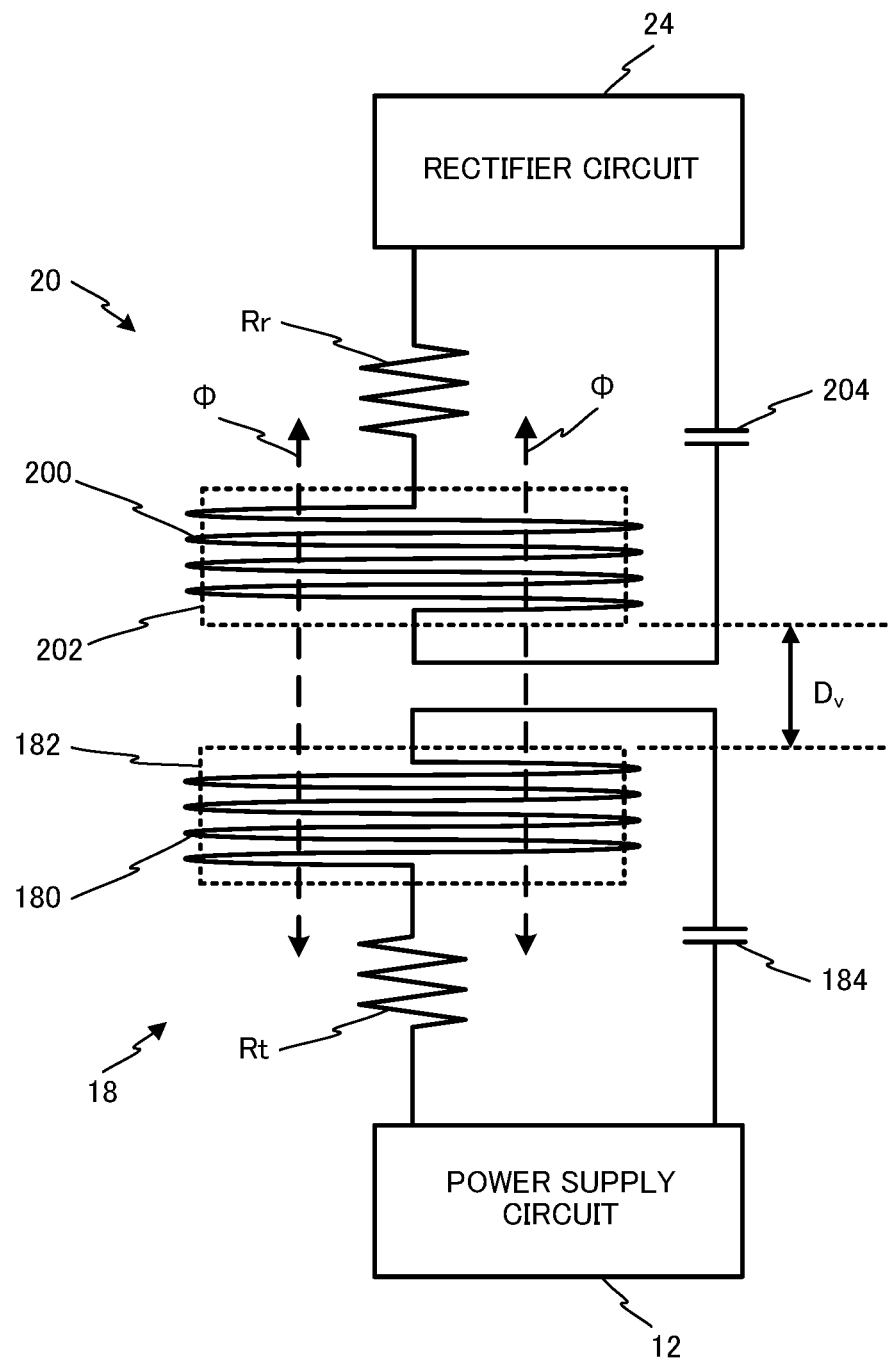
FIG. 3 is an equivalent circuit diagram of a power-transmitting coil unit and a power-receiving coil unit according to Embodiment 1 of the present disclosure.

FIG. 3 is a diagram illustrating an equivalent circuit of the power-transmitting coil unit 18 and the power-receiving coil unit 20. Further, FIG. 3 explicitly illustrates DC resistance $R_t$ of the power-transmitting coil 180 and DC resistance $R_f$ of the power-receiving coil 200 that are not illustrated in FIG. 1 and FIG. 2.

As illustrated in FIG. 2, the power-transmitting coil unit 18 includes power-transmitting-side capacitors 184-1 and 184-2 each of which is connected between each of two terminals connecting the inverter circuit 160 and the power-transmitting coil unit 18, and each of two terminals of the power-transmitting coil 180. Note that the two power-transmitting-side capacitors 184-1 and 184-2 are illustrated as one power-transmitting-side capacitor 184 in the equivalent circuit of the power-transmitting coil unit 18 illustrated in and after FIG. 3. The power-transmitting-side capacitor 184 is an example of a power-transmitting-side capacitor in the present disclosure. Further, the power-transmitting coil 180 constitutes a resonance circuit along with the power-transmitting-side capacitors 184-1 and 184-2.

The power-receiving coil unit 20 also has a configuration similar to that of the power-transmitting coil unit 18 and includes two power-receiving-side capacitors. The two power-receiving-side capacitors are illustrated as one power-receiving-side capacitor 204 in the equivalent circuit of the power-receiving coil unit 20 illustrated in and after FIG. 3. The power-receiving-side capacitor 204 is an example of a power-receiving-side capacitor in the present disclosure. Further, the power-receiving coil 200 constitutes a resonance circuit along with the power-receiving-side capacitor 204.

In a state of the electric vehicle 8 stopping at a predetermined parking position, the power-transmitting coil 180 and the power-receiving coil 200 do not mechanically interfere with each other and face each other in parallel at a distance $D_v$. In this state, the power-transmitting coil 180 and the power-receiving coil 200 are most tightly coupled through magnetic flux $\Phi$ and can most efficiently achieve power transmission.

Note that a coupling coefficient k indicating a degree of magnetic coupling between the power-transmitting coil 180 and the power-receiving coil 200 varies with change in a relative positional relation between the power-transmitting coil 180 and the power-receiving coil 200. Accordingly, when a relative positional relation between the power-transmitting coil unit 18 and the power-receiving coil unit 20 changes, reactance of an entire circuit including the magnetically coupled power-transmitting coil unit 18 and power-receiving coil unit 20 viewed from the power supply circuit 12 changes, and a resonance frequency $f_{on}$ also changes. Note that k=0 to 1. Further, "the entire circuit including the magnetically coupled power-transmitting coil unit 18 and power-receiving coil unit 20" viewed from the power supply circuit 12 is simply referred to as a circuit including the power-transmitting coil unit 18 and the power-receiving coil unit 20 in the following description.

Figure 4:
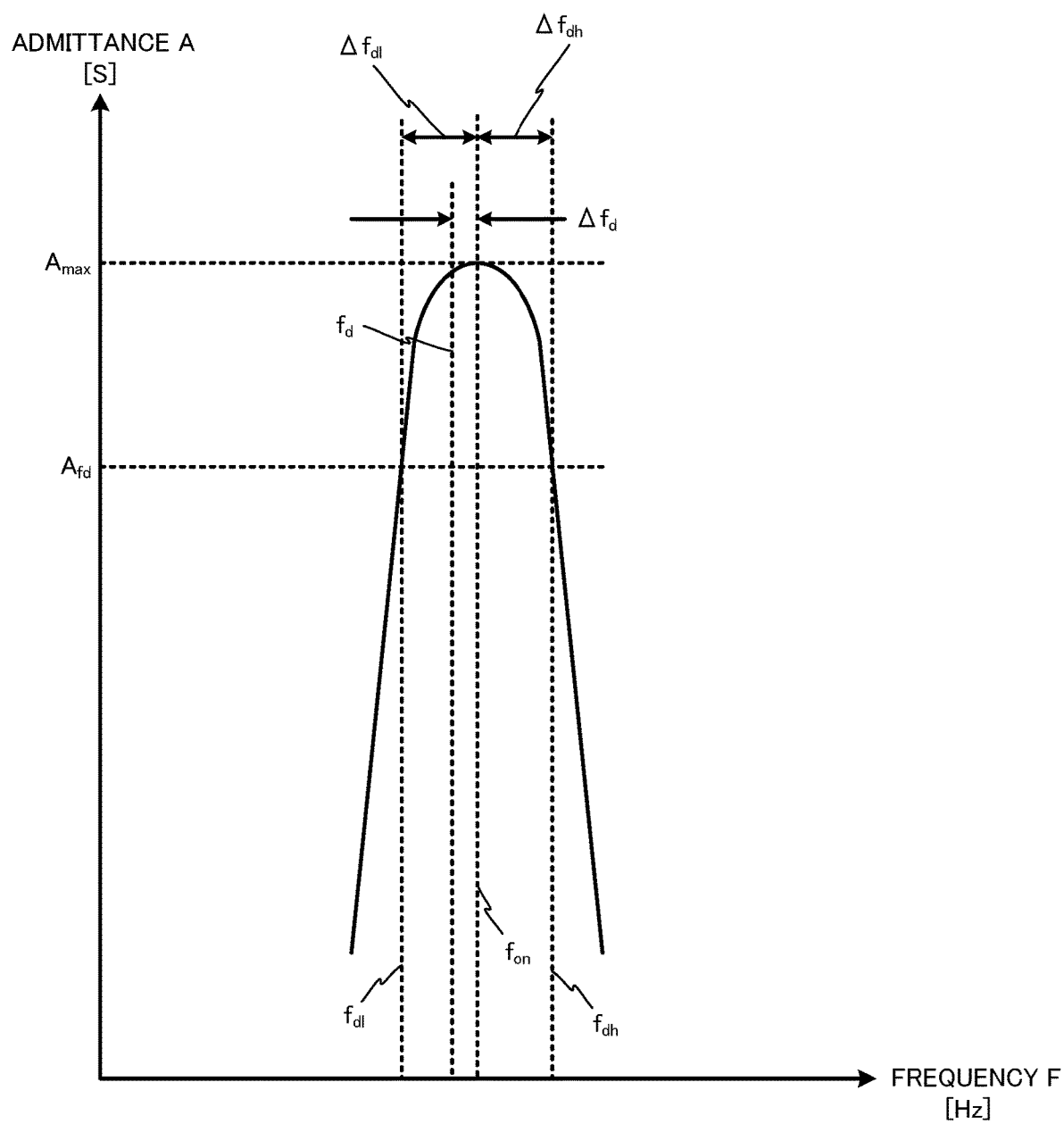
FIG. 4 is a diagram illustrating a frequency-versus-admittance characteristic when a relative positional relation between the power-transmitting coil unit and the power-receiving coil unit according to Embodiment 1 of the present disclosure is optimized.

FIG. 4 is a diagram illustrating a frequency-F-versus-admittance-A characteristic of the power-transmitting coil unit 18 and the power-receiving coil unit 20 when a relative positional relation between the circuits is optimized (the coupling coefficient k is maximized). Note that a unit of frequency F is Hz, and a unit of admittance A is siemens (S=1/Ω) in FIG. 4. The frequency-F-versus-admittance-A characteristic is hereinafter described as a frequency F-admittance A characteristic. As illustrated in FIG. 4, a resonance frequency of a circuit including the power-transmitting coil unit 18 and the power-receiving coil unit 20 becomes the resonance frequency $f_{on}$ when the relative positional relation between the circuits is as illustrated in FIG. 3.

Further, when the frequency of AC power supplied to the power-transmitting coil unit 18 matches the resonance frequency $f_{on}$, the power-transmitting coil unit 18 and the power-receiving coil unit 20 as a whole exhibits a maximum value $A_{max}$ of admittance A, and efficiency of power transmission from the power-transmitting coil unit 18 to the power-receiving coil unit 20 is maximized. Such a power transmission method is called a magnetic field resonance method and is characterized by a small decrease in power transmission efficiency from the power-transmitting coil unit 18 to the power-receiving coil unit 20 relative to a decrease in a value of the coupling coefficient k between the power-transmitting coil 180 and the power-receiving coil 200.

However, the frequency of AC power applied to the power-transmitting coil unit 18 may not necessarily be matched to the resonance frequency $f_{on}$. For example, in consideration of stability of an operation or the like of the power transmission system 1, the frequency may be shifted to a frequency $f_d$ in a direction on the higher side of or in a direction on the lower side of the resonance frequency $f_{on}$ by $\Delta f_d$.

Further, in a case of not transferring electric power much to the power-receiving coil unit 20 and heating a circuit element in the power factor improvement circuit 120 when the temperature is low, the control circuit 102 controls the inverter circuit 160 in such a way as to set the frequency of AC power supplied to the power-transmitting coil 180 to a frequency $f_{dl}$ or a frequency $f_{dh}$ at which power transmission efficiency is decreased, instead of the frequency $f_d$.

Specifically, the control circuit 102 controls the inverter circuit 160 and causes the inverter circuit 160 to generate AC power at the frequency $f_{dh}$ distant from the resonance frequency $f_{on}$ by $\Delta f_{dh}$ on the higher side or AC power with the frequency $f_{dl}$ distant from the resonance frequency $f_{on}$ by $\Delta f_{dl}$ on the lower side and supply the generated AC power to the power-transmitting coil unit 18. The absolute values $|\Delta f_{dh}|$ and $|\Delta f_{dl}|$ of $\Delta f_{dh}$ and $\Delta f_{dl}$ are set in such a way as to be greater than the absolute value $|\Delta f_d|$ of $\Delta f_d$. In other words, the frequencies $f_{dh}$ and $f_{dl}$ are more distant from the resonance frequency $f_{on}$ than the frequency $f_d$. At this time, a value of the admittance A of the circuit including the power-transmitting coil unit 18 and the power-receiving coil unit 20 decreases from $A_{max}$ to $A_{fd}$. Accordingly, AC power received by the power receiving device 2 decreases; and in this state, the power-transmitting coil unit 18 generates heat due to the DC resistance $R_t$ of the power-transmitting coil 180 and iron loss (eddy-current loss) of the magnetic plate 182, and the temperatures of the case and the internal atmosphere of the power-transmitting coil unit 18 rise. Furthermore, each element inside the power supply circuit 12 generates heat, and the temperatures of the case and the internal atmosphere of the power supply circuit 12 rise. The heat generated in the power-transmitting coil unit 18 is used for raising the temperature of a member in a surrounding area. Further, the electrolytic capacitor 132 is heated by the heat generated in the power supply circuit 12.

Figure 5:
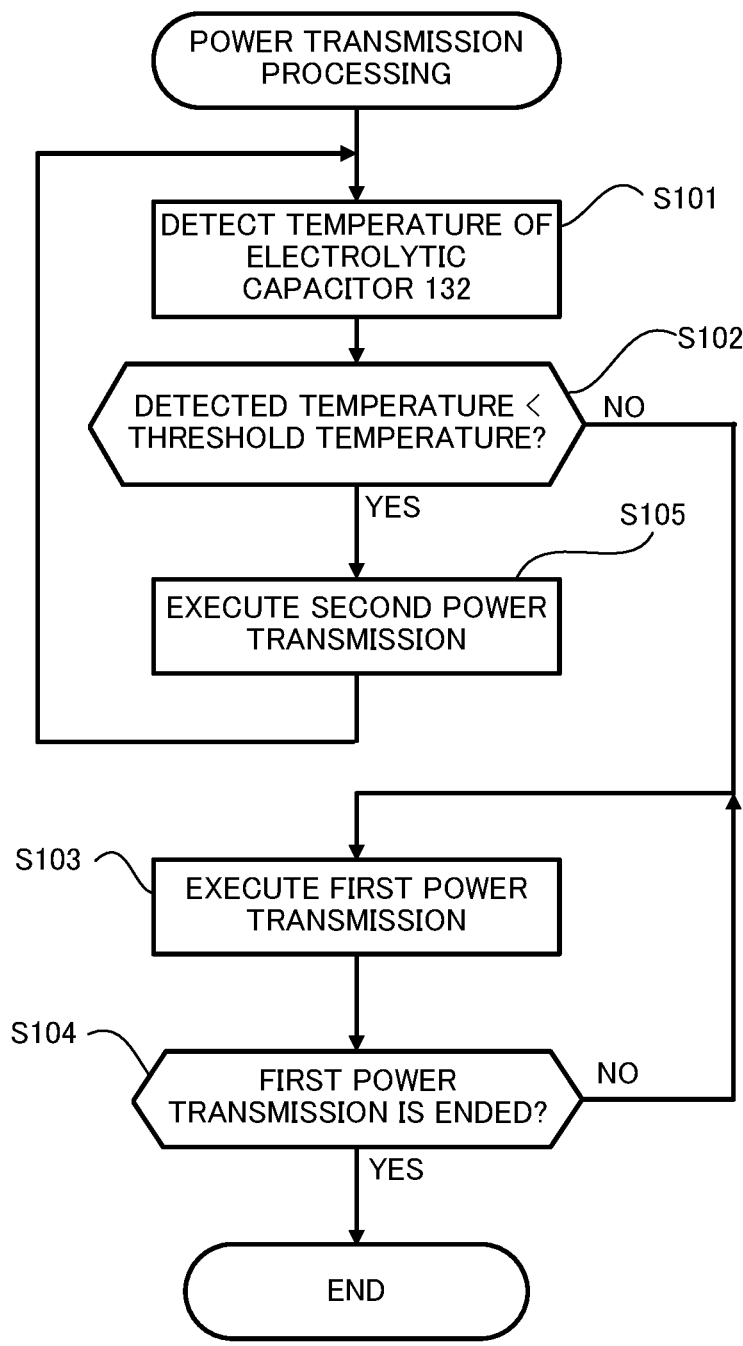
FIG. 5 is a flowchart illustrating power transmission processing executed by the power transmission system according to Embodiment 1.

Next, power transmission processing executed by the power transmission system 1 with the configuration described above will be described with reference to a flowchart in FIG. 5. Note that, in the following description, an operation of transmitting electric power with a relatively high degree of efficiency from the power-transmitting coil unit 18 to the power-receiving coil unit 20 for charging the storage battery 80 by magnetic coupling between the power-transmitting coil unit 18 and the power-receiving coil unit 20 is referred to as "first power transmission," and an operation of raising the temperature of a part without transferring electric power much from the power-transmitting coil unit 18 to the power-receiving coil unit 20 by intentionally decreasing power transmission efficiency is referred to as "second power transmission"; and the two are distinguished as such.

First, an operation of the power transmission system 1 when only the first power transmission is to be executed without the need to execute the second power transmission will be described. When receiving a charging start instruction, the control circuit 102 starts the power transmission processing illustrated in FIG. 5 and first detects the temperature of the electrolytic capacitor 132 by the temperature detection circuit 134 (Step S101). Note that the instruction to start charging is given by a charging start instruction signal.

Next, the control circuit 102 determines whether the detected temperature of the electrolytic capacitor 132 is lower than a threshold temperature (Step S102). The threshold temperature is a temperature set based on the lower limit of an allowable operating range and is, for example, −20° C. It is assumed here that the temperature detected by the temperature detection circuit 134 is equal to or higher than the threshold temperature (Step S102: No).

In this case, the control circuit 102 executes the first power transmission (Step S103). Specifically, the control circuit 102 controls the inverter circuit 160 and causes the inverter circuit 160 to generate AC power at the frequency $f_d$ that can be stably transmitted from the power-transmitting coil unit 18 to the power-receiving coil unit 20 with a substantially highest degree of efficiency and supply the AC power to the power-transmitting coil unit 18. In other words, the control circuit 102 causes the inverter circuit 160 to output an AC signal at the frequency $f_d$ predetermined close to the resonance frequency $f_{on}$ of the circuit including the power-transmitting coil unit 18 and the power-receiving coil unit.

Consequently, current at the frequency $f_d$ flows in the power-transmitting coil 180 in the power-transmitting coil unit 18, and alternating magnetic flux $\Phi$ at the frequency $f_d$ is induced. The alternating magnetic flux $\Phi$ is interlinked with the power-receiving coil 200 in the power-receiving coil unit 20, and a counter electromotive force is induced in the power-receiving coil 200. The rectifier circuit 24 rectifies and smoothes voltage induced in the power-receiving coil 200 and supplies the resulting power to the storage battery 80. The control circuit 102 continues the first power transmission until the storage battery 80 is sufficiently charged.

The control circuit 102 determines whether to end the first power transmission (Step S104). For example, the control circuit 102 determines whether the storage battery 80 is sufficiently charged by detecting the voltage of the storage battery 80 through a voltage detection circuit (unillustrated) or the like. When the charging is not sufficient, the control circuit 102 determines not to end the first power transmission (Step S104: No) and continues the first power transmission. When the charging is sufficient, the control circuit 102 determines to end the first power transmission (Step S104: Yes) and ends this round of power transmission processing. For example, when the voltage of the storage battery 80 is higher than a reference value, the control circuit 102 determines that the storage battery 80 is sufficiently charged and ends this round of power transmission processing.

Next, an operation of the power transmission system 1 when the second power transmission is required before the first power transmission will be described. When receiving a charging start instruction, the control circuit 102 starts the power transmission processing illustrated in FIG. 5, detects the temperature of the electrolytic capacitor 132 by the temperature detection circuit 134 (Step S101), and compares the detected temperature with the threshold temperature (Step S102). It is assumed here that the detected temperature is lower than the threshold temperature (Step S102: Yes).

In this case, the control circuit 102 executes the second power transmission (Step S105). Specifically, the control circuit 102 controls the inverter circuit 160 and sets the frequency of AC power supplied to the power-transmitting coil 180 by the inverter circuit 160 to the frequency $f_{dl}$ or the frequency $f_{dh}$ at which power transmission efficiency is decreased, instead of the frequency $f_d$.

In other words, the control circuit 102 controls the inverter circuit 160 and causes the inverter circuit 160 to generate AC power at the frequency $f_{dh}$ distant from the resonance frequency $f_{on}$ by $\Delta f_{dh}$ on the higher side or AC power at the frequency $f_{dl}$ distant from the resonance frequency $f_{on}$ by $\Delta f_{dl}$ on the lower side and supply the AC power to the power-transmitting coil unit 18.

Since the frequencies $f_{dh}$ and the $f_{dl}$ are shifted from the resonance frequency $f_{on}$ in the second power transmission, electric power is hardly transferred from the power-transmitting coil unit 18 to the power-receiving coil unit 20. However, each element inside the power supply circuit 12, such as a field effect transistor (FET) constituting a circuit or a ferrite core in a filter circuit, generates heat, and the temperatures of the case and the internal atmosphere of the power supply circuit 12 rise. Consequently, the electrolytic capacitor 132 is heated, and the temperature of the electrolytic capacitor 132 rises. Accordingly, the capacitance of the electrolytic capacitor 132 gradually increases. Further, when the power factor improvement circuit 120 and the inverter circuit 160 constituting the power supply circuit 12 are accommodated in separate cases, each element inside the power factor improvement circuit 120 generates heat and the temperatures of the case and the internal atmosphere of the power factor improvement circuit 120 rises; and thus the electrolytic capacitor 132 is heated.

Further, the value of the admittance A of the power-transmitting coil unit 18 and the power-receiving coil unit 20 as a whole decreases from $A_{max}$ to $A_{fd}$. Accordingly, AC power received by the power receiving device 2 from the power transmission device 10 decreases; and in this state, the power-transmitting coil unit 18 generates heat due to the DC resistance $R_t$ of the power-transmitting coil 180 in the power-transmitting coil unit 18 and the iron loss (eddy-current loss) of the magnetic plate 182, and the temperatures of the case and the internal atmosphere of the power-transmitting coil unit 18 rises. The heat generated in the power-transmitting coil unit 18 is used for raising the temperature of a member in a surrounding area.

While executing the second power transmission, the control circuit 102 periodically detects the temperature of the electrolytic capacitor 132 by the temperature detection circuit 134 (Step S101) and determines whether the detected temperature is lower than the threshold temperature (Step S102).

When determining that the detected temperature is lower than the threshold temperature (Step S102: Yes), the control circuit 102 continues execution of the second power transmission (Step S105). On the other hand, when determining that the detected temperature is equal to or higher than the threshold temperature (Step S102: No), a determination is made that the capacitance of the electrolytic capacitor 132 nearly reaches a rated value, and the control circuit 102 advances the processing to aforementioned Step S103 and thereafter causes the power-transmitting coil unit 18 to execute the first power transmission until the storage battery 80 is sufficiently charged.

As described above, when the detected temperature is lower than the threshold temperature, the second power transmission for raising the temperature of a part is executed before the first power transmission being a normal power transmission (feeding) operation is started, according to the present embodiment. Although electric power is hardly transferred from the power-transmitting coil unit 18 to the power-receiving coil unit 20 in the second power transmission, each element inside the power supply circuit 12, such as a FET constituting a circuit or a ferrite core in a filter circuit, generates heat similarly to during execution of the first power transmission, and the temperatures of the case and the internal atmosphere of the power supply circuit 12 rise.

Further, when the power factor improvement circuit 120 and the inverter circuit 160 constituting the power supply circuit 12 are accommodated in separate cases, each element inside the power factor improvement circuit 120 generates heat similarly to during execution of the first power transmission, and the temperatures of the case and the internal atmosphere of the power factor improvement circuit 120 rise. Further, AC power received by the power receiving device 2 decreases; and in this state, the power-transmitting coil unit 18 generates heat due to the DC resistance $R_t$ of the power-transmitting coil 180 and the iron loss of the magnetic plate 182, and the temperatures of the case and the internal atmosphere of the power-transmitting coil unit 18 rise. The heat generated in the power-transmitting coil unit 18 raises the temperature of a member in a surrounding area. Accordingly, the temperature of the electrolytic capacitor 132 also rises, and the capacitance of the electrolytic capacitor 132 is restored nearly to the rated value; and the electrolytic capacitor 132 enters a state in which the function thereof can be exhibited. Accordingly, electric power with a small number of ripples and a small amount of noise can be transmitted in the subsequent first power transmission. Further, since the second power transmission is for raising the temperature of a part, power transmission efficiency of the second power transmission is intentionally decreased compared with during execution of the first power transmission in such a way that electric power containing a large number of ripples and a large amount of noise is not received by the power receiving device 2 during execution of the second power transmission.

Further, while the second power transmission is executed when the temperature of the electrolytic capacitor 132 detected by the temperature detection circuit 134 is lower than the threshold temperature in the present embodiment, the control circuit 102 may execute the second power transmission without performing temperature detection of the electrolytic capacitor 132 by the temperature detection circuit 134 when receiving a charging start instruction. In this case, the temperature detection circuit 134 may not be provided.

Embodiment 2

A technique of decreasing an amount of electric power transmitted from the power-transmitting coil unit 18 to the power-receiving coil unit 20 by shifting the frequency of AC power supplied from the power supply circuit 12 to the power-transmitting coil unit 18 from the frequency $f_d$ in the first power transmission has been described in Embodiment 1. The technique of decreasing an amount of electric power transmitted from the power-transmitting coil unit 18 to the power-receiving coil unit 20 is not limited to the above, and any technique capable of removing the circuit including the power-transmitting coil unit 18 and the power-receiving coil unit 20 as a whole from a resonant state is applicable. Embodiment 2 employing a technique of decreasing an amount of electric power transmitted from a power-transmitting coil unit 18 to a power-receiving coil unit 20 by changing impedance will be described below.

Figure 6:
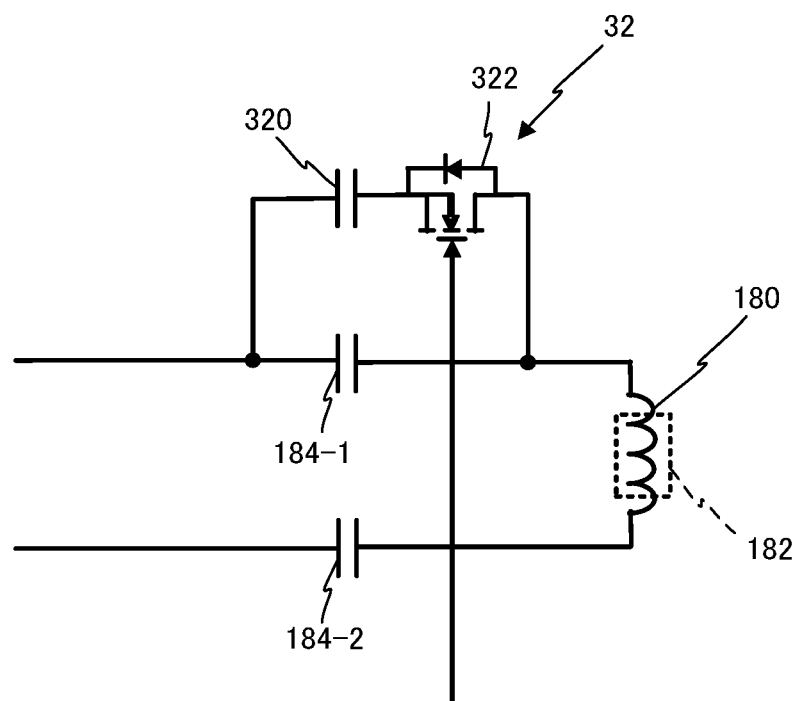
FIG. 6 is a circuit diagram of a power-transmitting coil unit according to Embodiment 2 of the present disclosure.

A basic configuration of a power transmission system according to the present embodiment is similar to the configuration of the power transmission system 1 according to Embodiment 1. However, as illustrated in FIG. 6, a power transmission device 10 further includes an impedance adjustment circuit 32. Note that the impedance adjustment circuit 32 may be included in a power supply circuit 12, may be included in the power-transmitting coil unit 18, or may be placed in another part.

Figure 7:
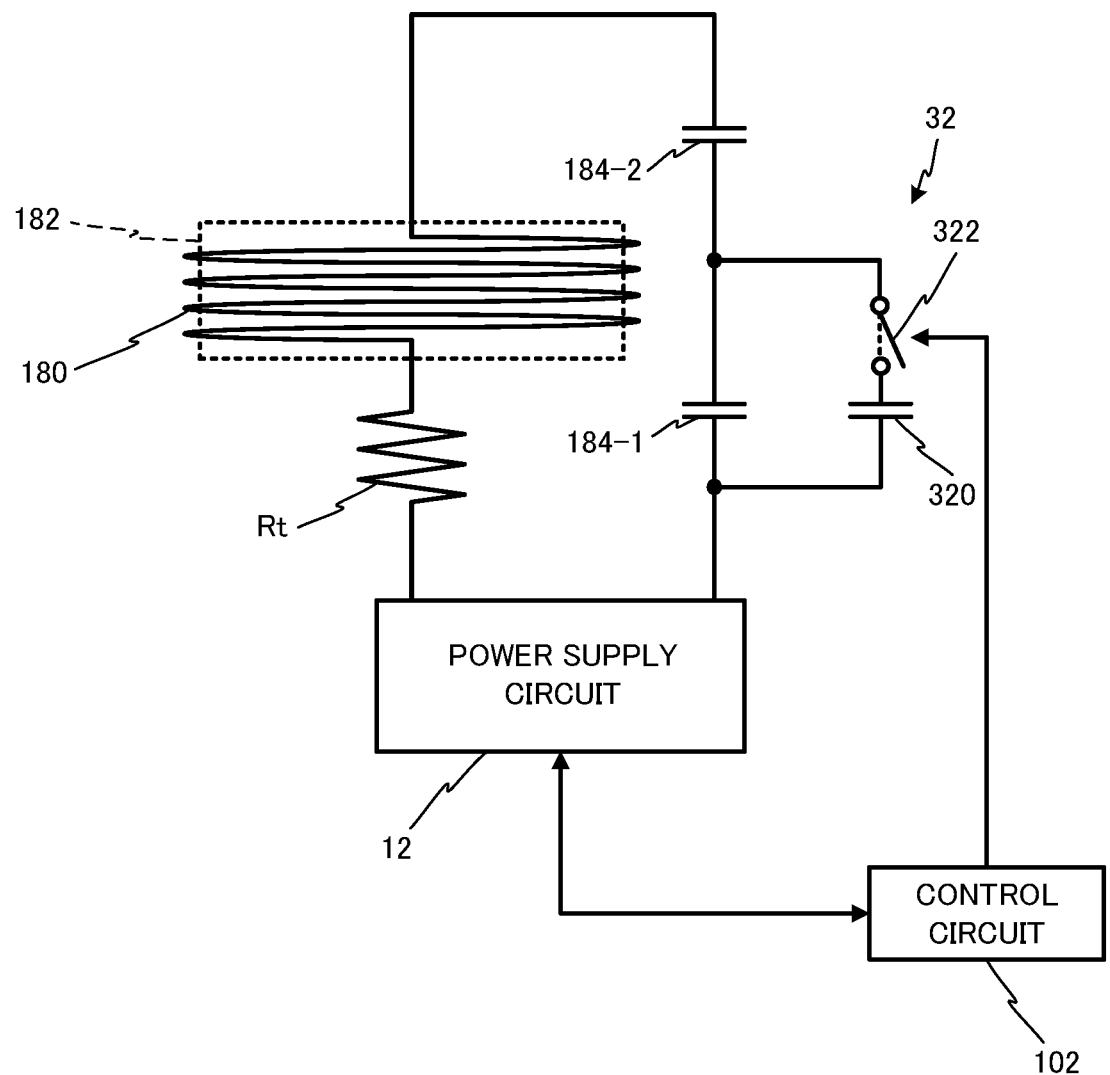
FIG. 7 is an equivalent circuit diagram of the power-transmitting coil unit according to Embodiment 2 of the present disclosure.

As illustrated in FIG. 6, the impedance adjustment circuit 32 is configured with a series circuit including a MOS-FET 322 performing an on/off operation in accordance with control by a control circuit 102 and a power-transmitting-side capacitor 320 and is connected in parallel with a power-transmitting-side capacitor 184-1. As illustrated in FIG. 7, the MOS-FET 322 operates as a switch, connects the power-transmitting-side capacitor 184-1 to the power-transmitting-side capacitor 320 in parallel by being turned on (continuous), and changes the impedance of a circuit including the power-transmitting coil unit 18 and the power-receiving coil unit 20 from the impedance under normal operation when the MOS-FET 322 is turned off. Further, for example, the frequency of electric power supplied to the power-transmitting coil unit 18 by the power supply circuit 12 is a frequency $f_d$ in the first power transmission as well as in the second power transmission in the present embodiment.

Figure 8:
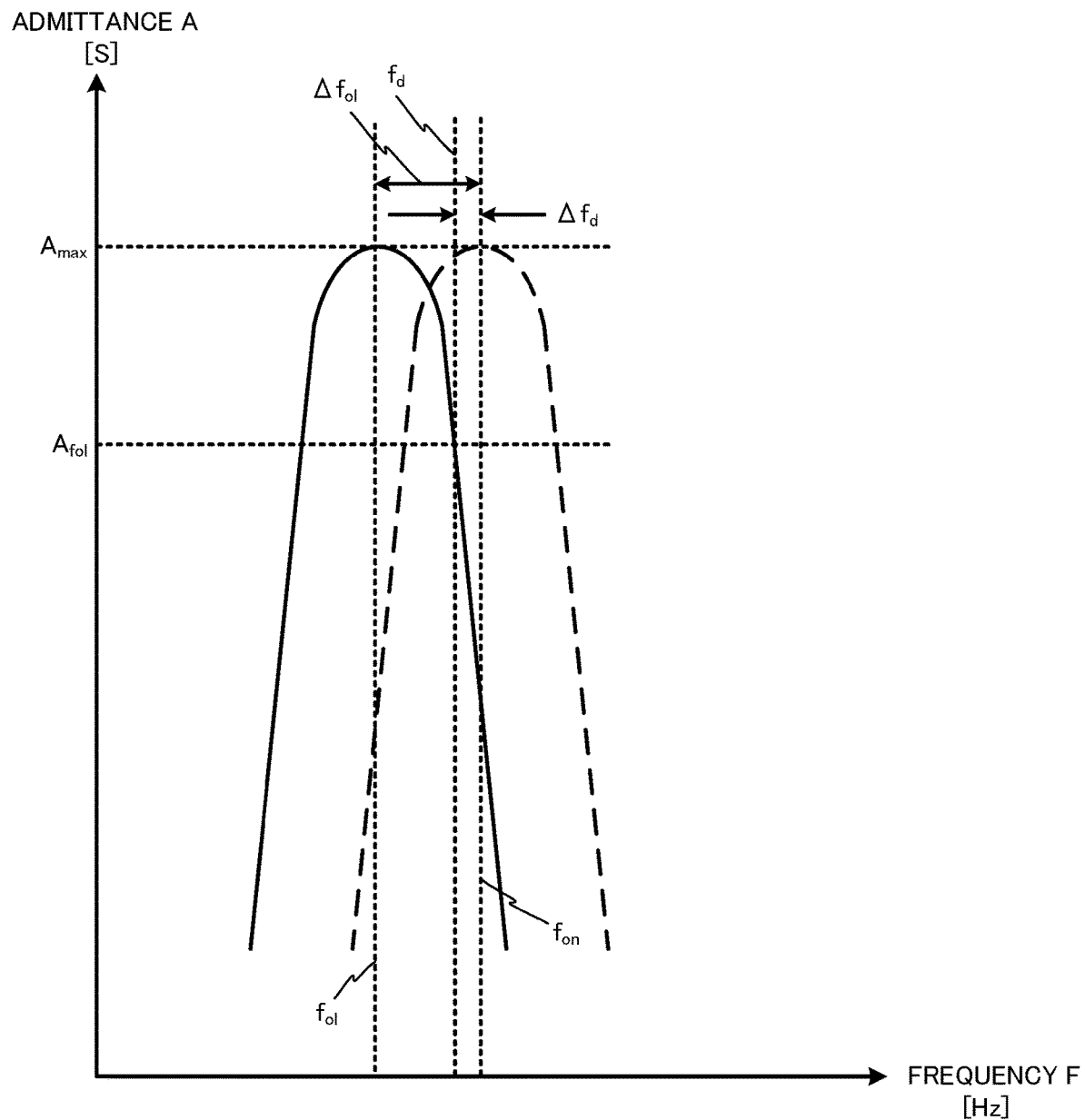
FIG. 8 is a diagram illustrating a frequency-versus-admittance characteristic when a relative positional relation between the power-transmitting coil unit and a power-receiving coil unit according to Embodiment 2 of the present disclosure is optimized.

FIG. 8 is a diagram illustrating a frequency F-admittance A characteristic of the circuit including the power-transmitting coil unit 18 and the power-receiving coil unit 20 when a relative positional relation between the power-transmitting coil unit 18 and the power-receiving coil unit 20 is optimized. In FIG. 8, a broken line represents a characteristic in a state of the MOS-FET 322 being turned off (cutoff), and a solid line represents a characteristic in a state of the MOS-FET 322 being turned on. As illustrated in FIG. 8, when the control circuit 102 turns the MOS-FET 322 off, the circuit including the power-transmitting coil unit 18 and the power-receiving coil unit 20 as a whole resonates at a resonance frequency $f_{on}$. The control circuit 102 controls the inverter circuit 160 and causes the inverter circuit 160 to supply AC power at the frequency $f_d$ shifted from the resonance frequency $f_{on}$ by $\Delta f_d$ to the power-transmitting coil 180 and then causes the power-transmitting coil 180 to execute the first power transmission.

On the other hand, when raising the temperature of a part in the power supply circuit 12 in a state of an amount of electric power transmitted to the power-receiving coil unit 20 being decreased, the control circuit 102 turns the MOS-FET 322 on. Then, the capacitance of the power-transmitting-side capacitor 320 is added to the capacitance of the power-transmitting-side capacitor 184-1, and thus the impedance changes. Accordingly, the resonance frequency of the entire circuit including the power-transmitting coil unit 18 and the power-receiving coil unit 20 decreases from the frequency $f_{on}$ by $\Delta f_{ol}$ and becomes a resonance frequency $f_{ol}$. The difference ($\Delta f_{ol}-\Delta f_d$) between the frequency $f_d$ of AC power and the resonance frequency $f_{ol}$ is greater than the difference $\Delta f_d$ between the frequency $f_d$ of the AC power and the resonance frequency $f_{on}$, and thus the following inequality holds: $\Delta f_d<(\Delta f_{ol}-\Delta f_d)$, thereby leading $2\times\Delta f_d<\Delta f_{ol}$. In other words, the power-transmitting coil unit 18 and the power-receiving coil unit 20 as a whole may become a resonance circuit with the resonance frequency $f_{on}$ or a resonance circuit with the resonance frequency $f_{ol}$ in accordance with control by the control circuit 102. Thus, the control circuit 102 controls the MOS-FET 322 in such a way that the impedance of the circuit including the power-transmitting coil unit 18 and the power-receiving coil unit 20 as a whole during execution of the first power transmission and impedance during execution of the second power transmission are different from each other.

Accordingly, when the control circuit 102 turns the MOS-FET 322 on, a value of admittance A of the circuit including the power-transmitting coil unit 18 and the power-receiving coil unit 20 as a whole at the frequency $f_d$ decreases from $A_{max}$ being a nearly maximum value to $A_{fol}$, as illustrated in FIG. 8. When the value of the admittance A decreases, power transmission efficiency from the power-transmitting coil unit 18 to the power-receiving coil unit 20 decreases.

In other words, by causing the power-transmitting coil unit 18 to supply AC power at the frequency $f_d$ to the inverter circuit 160 in a state of the MOS-FET 322 being turned on, the control circuit 102 can cause the power-transmitting coil unit 18 to execute the second power transmission. Note that control for switching between the first power transmission and the second power transmission by the control circuit 102 according to Embodiment 2 is similar to the control described above with reference to FIG. 5. Further, change of the resonance frequency by adjusting impedance is not limited to the technique of changing capacitance of a circuit and may be achieved by changing inductance. For example, the change can be achieved by changing a relative position between a magnetic plate 182 and a power-transmitting coil 180 constituting the power-transmitting coil unit 18.

Embodiment 3

The technique of adjusting the impedance of the circuit including the power-transmitting coil unit 18 and the power-receiving coil unit 20 may be any technique without being limited to the technique described in Embodiment 2. For example, either one or both of the power-transmitting-side capacitors 184-1 and 184-2 may be configured with one or more variable capacitors, and capacitance thereof may be changed. Embodiment 3 employing such a configuration will be described below.

Figure 9:
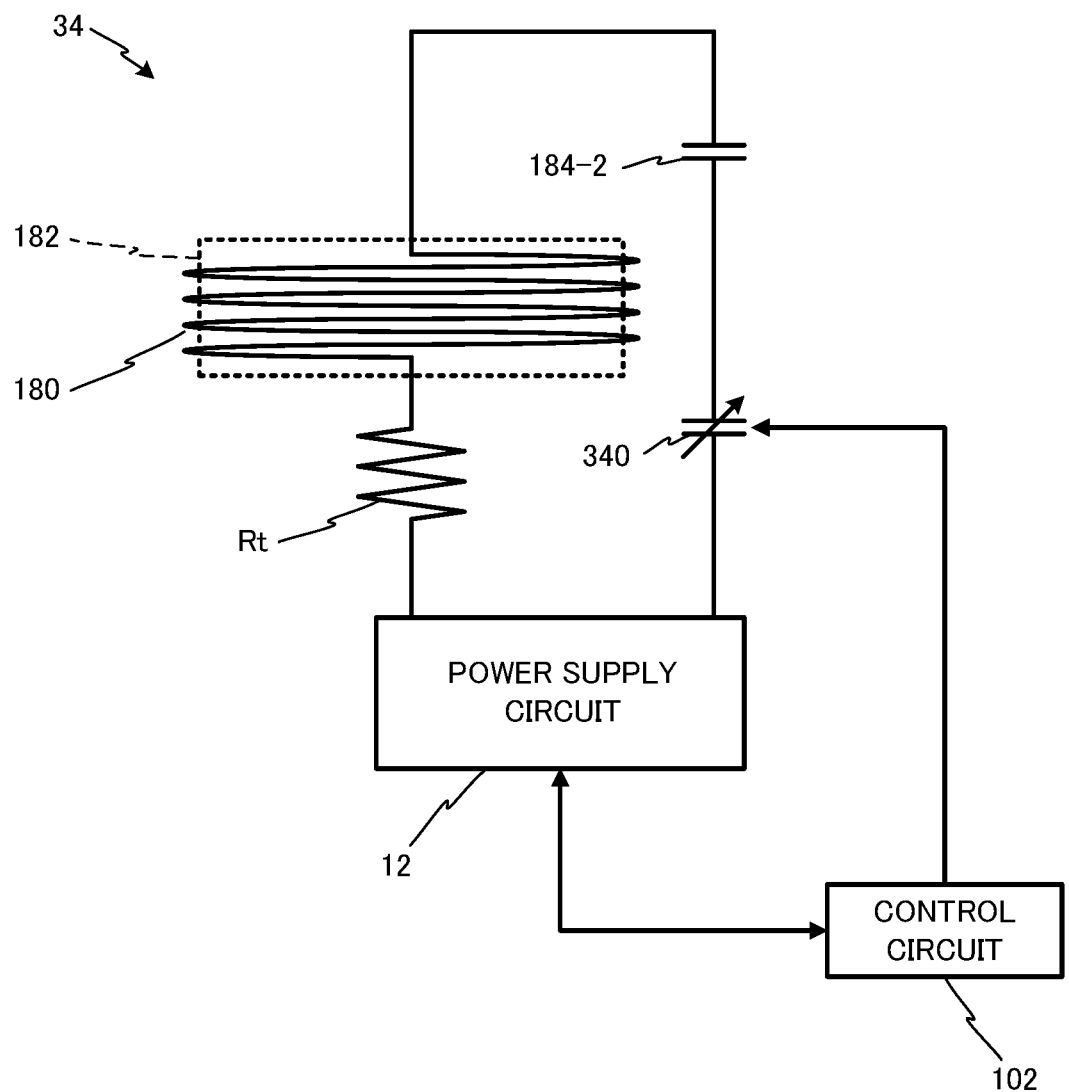
FIG. 9 is an equivalent circuit diagram of a power-transmitting coil unit according to Embodiment 3 of the present disclosure.

A basic configuration of a power transmission system according to the present embodiment is similar to the configuration of the power transmission system 1 according to Embodiment 1 illustrated in FIG. 2. However, as illustrated in FIG. 9, a power-transmitting coil unit 34 is used in place of the power-transmitting coil unit 18. The power-transmitting coil unit 34 has a configuration in which the fixed capacitance power-transmitting-side capacitor 184-1 in the power-transmitting coil unit 18 is replaced by a variable capacitance power-transmitting-side capacitor 340 a capacitance value of which changes continuously or in stages. For example, the power-transmitting-side capacitor 340 is configured with a variable capacitor or a varicap diode, and a capacitance value of the power-transmitting-side capacitor 340 can be adjusted by a control circuit 102.

Figure 10:
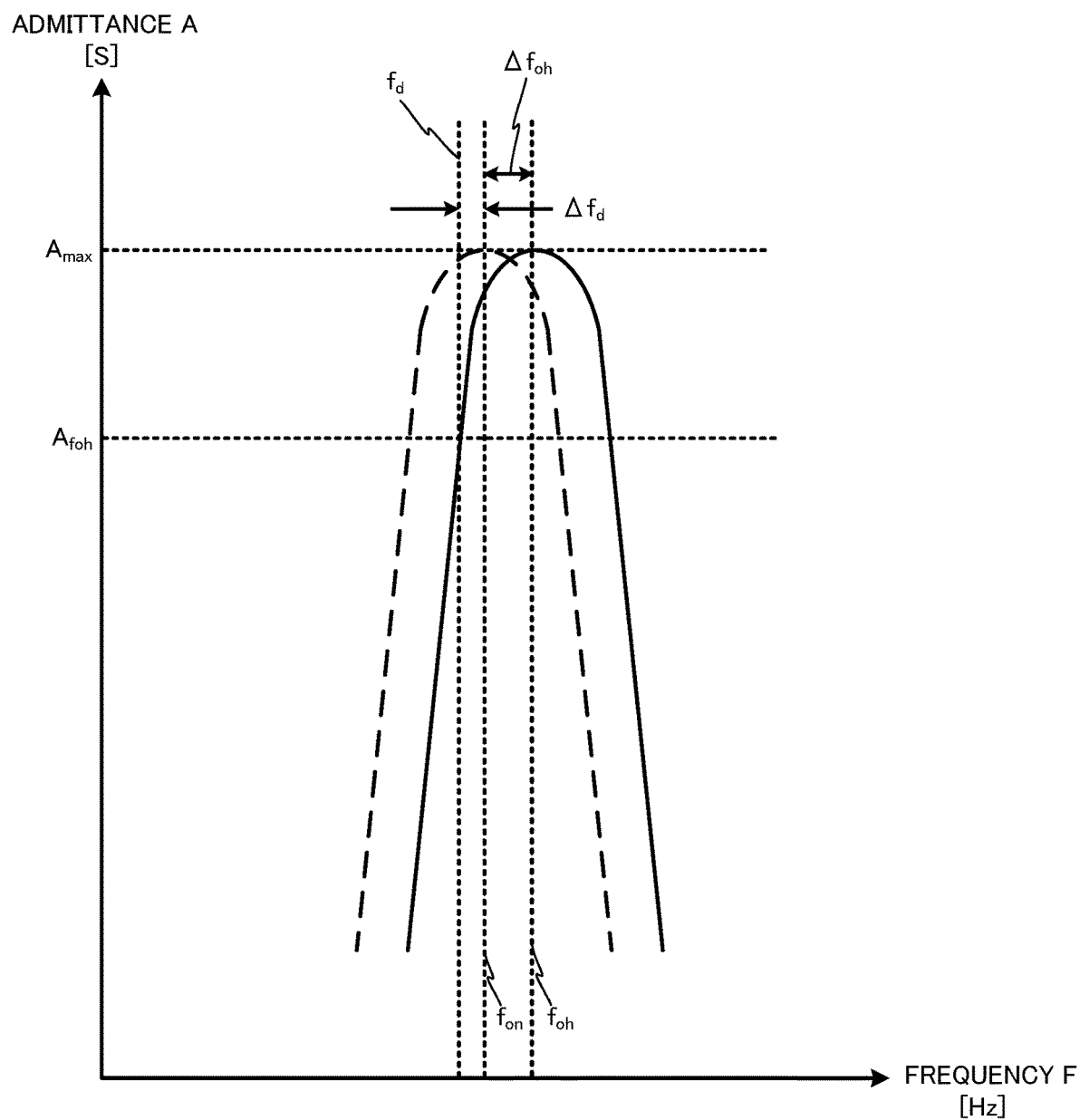
FIG. 10 is a diagram illustrating a frequency-versus-admittance characteristic when a relative positional relation between the power-transmitting coil unit and a power-receiving coil unit according to Embodiment 3 of the present disclosure is optimized.

The control circuit 102 is a device controlling an impedance adjustment circuit 32 in such a way that the impedance of a power-transmitting-side circuit during the first power transmission and the impedance of the power-transmitting-side circuit during the second power transmission are different from each other. For example, when executing the first power transmission, the control circuit 102 sets the capacitance value of the power-transmitting-side capacitor 340 to a predetermined first capacitance value. At this time, a circuit including the power-transmitting coil unit 34 and a power-receiving coil unit 20 resonates at a resonance frequency $f_{on}$ as indicated by a broken line in FIG. 10.

On the other hand, when executing the second power transmission, the control circuit 102 sets the capacitance value of the power-transmitting-side capacitor 340 to a second capacitance value smaller than the first capacitance value. At this time, the resonance frequency of the circuit including the power-transmitting coil unit 34 and the power-receiving coil unit 20 becomes a resonance frequency $f_{oh}$ higher than the resonance frequency $f_{on}$ by $\Delta f_{oh}$ as indicated by a solid line in FIG. 10. The difference ($\Delta f_{oh}+\Delta f_d$) between a frequency $f_d$ of AC power supplied to the power-transmitting coil unit 34 by a power supply circuit 12 and the resonance frequency $f_{oh}$ is greater than the difference $\Delta f_d$ between the frequency $f_d$ and the resonance frequency $f_{on}$, and thus the following inequality holds: $\Delta f_d<(\Delta f_{oh}+\Delta f_d)$, thereby leading $0<\Delta f_{on}$.

Further, control for switching between the first power transmission and the second power transmission by the control circuit 102 may be similar to the control described above with reference to FIG. 5.

Further, impedance of a circuit may be changed by configuring capacitance in the power-receiving coil unit 20 with a variable capacitor and changing the capacitance value or by making inductance of an inductor included in a power-transmitting coil unit 18 variable and changing the inductance.

Embodiment 4

Figure 11:
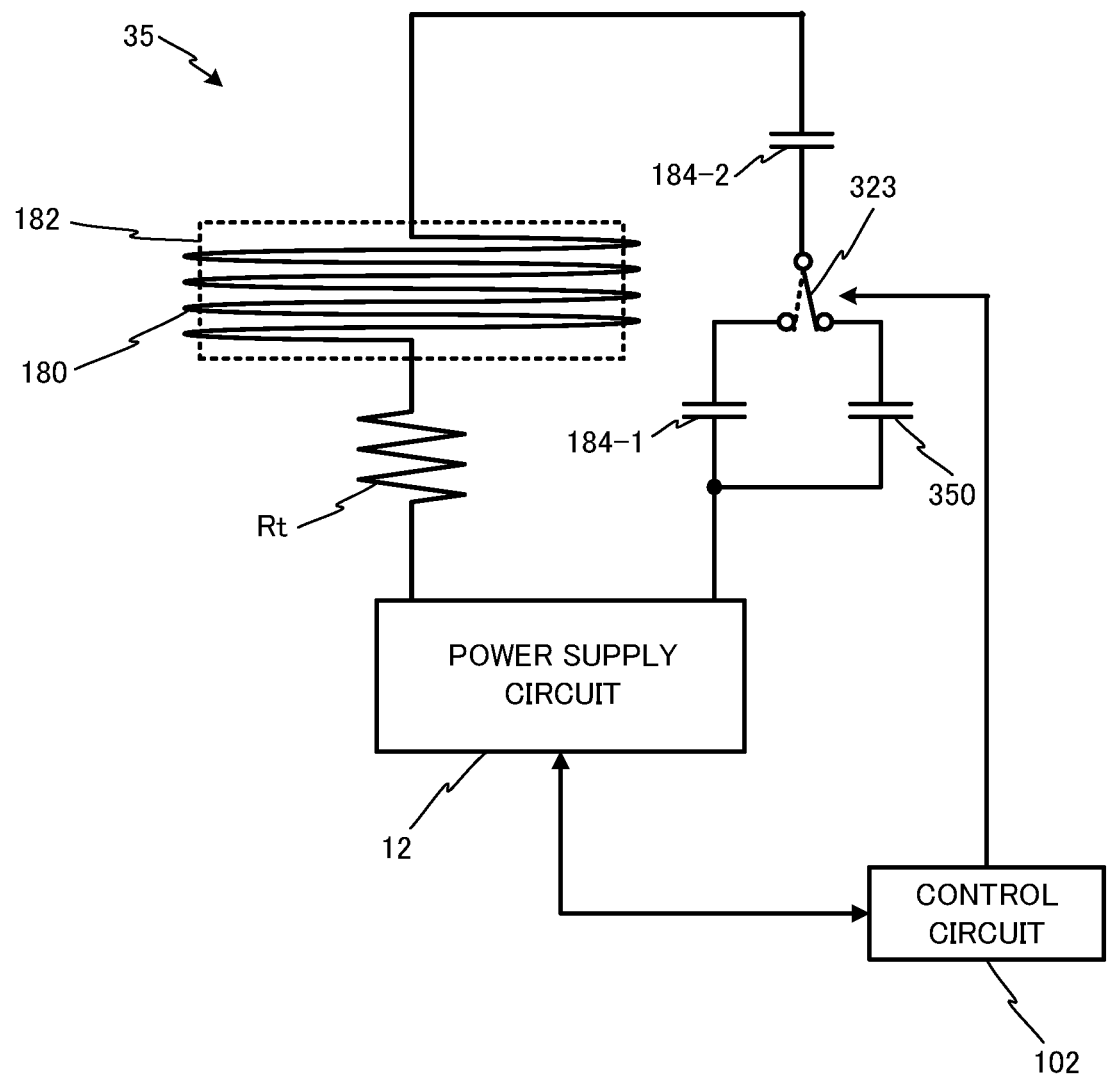
FIG. 11 is an equivalent circuit diagram of a power-transmitting coil unit according to Embodiment 4 of the present disclosure.

A technique of changing the impedance of a circuit including a power-transmitting coil unit and a power-receiving coil unit may be any technique without being limited to the techniques described in Embodiments 2 and 3. For example, a power-transmitting coil unit 35 may be used in place of the power-transmitting coil unit 18, as illustrated in FIG. 11. The power-transmitting coil unit 35 has a configuration in which a power-transmitting-side capacitor 350 is connected to a power-transmitting-side capacitor 184-1 in parallel, and one of the capacitors is selected by a switch 323. For example, the switch 323 is a changeover switch configured with a semiconductor switch.

The control circuit 102 controls the switch 323 in such a way that the power-transmitting-side capacitor 184-1 is connected to a power-transmitting-side capacitor 184-2 when the resonance frequency of a circuit including the power-transmitting coil unit 35 and a power-receiving coil unit 20 is set to, for example, $f_{on}$ indicated in FIG. 8. On the other hand, the control circuit 102 controls the switch 323 in such a way that the power-transmitting-side capacitor 350 is connected to the power-transmitting-side capacitor 184-2 when the resonance frequency is set to $f_{ol}$ indicated in FIG. 8. The configuration can also change the impedance of the circuit including the power-transmitting coil unit 35 and the power-receiving coil unit 20.

The impedance may also be changed by switching connection of inductors.

While an example of placing an impedance adjustment circuit 32 including the power-transmitting-side capacitor 350 and the switch 323 in the power-transmitting coil unit 35 has been described in the above description, the impedance adjustment circuit may be placed anywhere in the power transmission device 10. For example, the impedance adjustment circuit may be placed in a power supply circuit 12.

Embodiment 5

Figure 12:
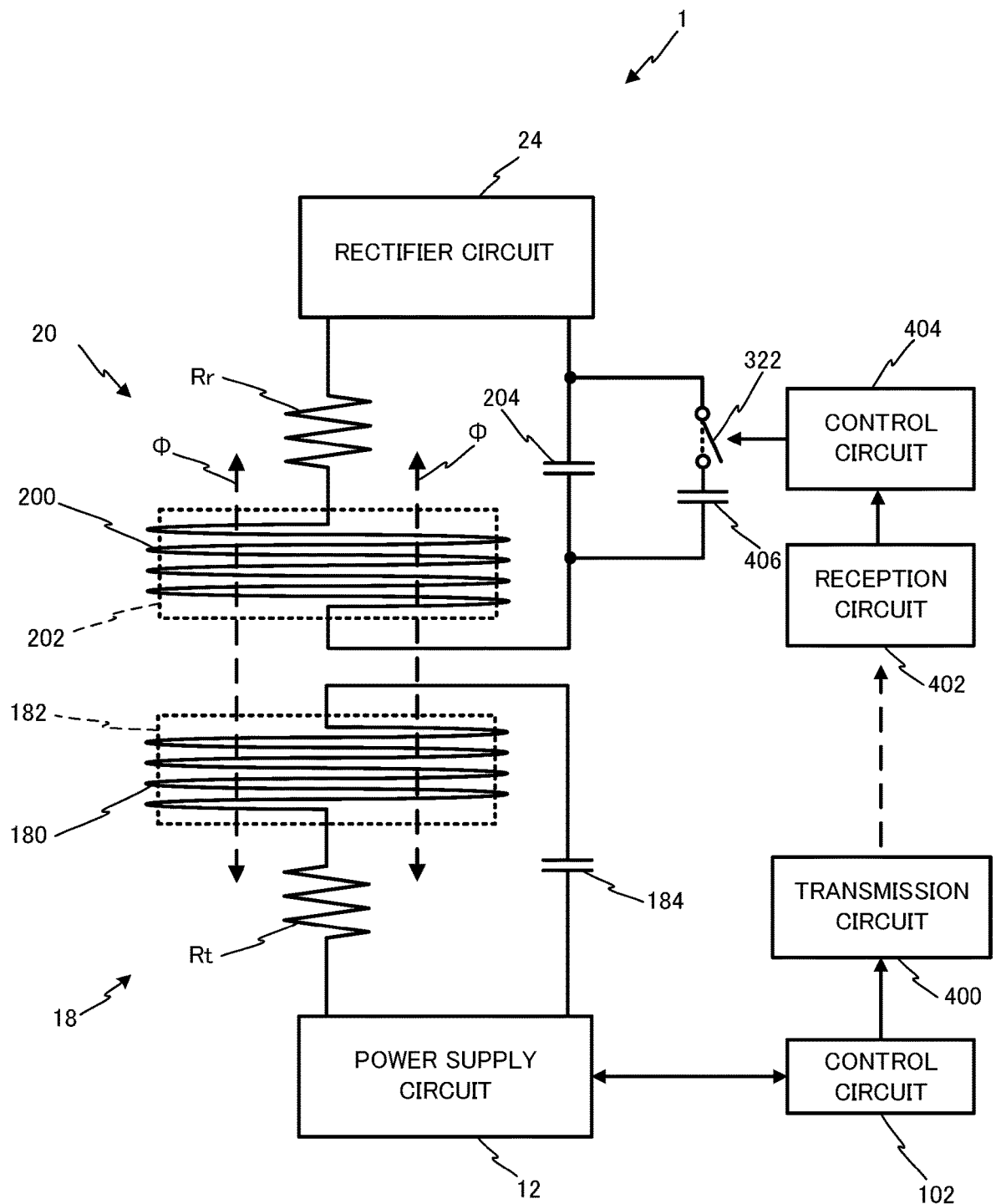
FIG. 12 is a diagram illustrating a configuration of a power transmission system according to Embodiment 5 of the present disclosure.

Examples of changing the impedance of a power-transmitting-side circuit have been described in Embodiments 2 to 4. An example of changing the impedance of a power-receiving-side circuit will be described in the present embodiment. As illustrated in FIG. 12, a power transmission system according to the present embodiment has a configuration in which a transmission circuit 400 is added to the power transmission device 10 in the power transmission system 1 according to Embodiment 1, an impedance adjustment circuit configured with a series circuit including a power-receiving-side capacitor 406 and a MOS-FET 322 is connected in parallel with a power-receiving-side capacitor 204 in a power-receiving coil unit 20, and a reception circuit 402 and a control circuit 404 are added to the power receiving device 2. Note that the MOS-FET 322 is represented by an electric circuit symbol indicating a switch in FIG. 12.

The transmission circuit 400 receives a detected-temperature signal being a signal indicating the temperature of the electrolytic capacitor 132 detected by the temperature detection circuit 134 in the power factor improvement circuit 120 from the control circuit 102 and transmits the detected-temperature signal to the reception circuit 402. The reception circuit 402 supplies the detected-temperature signal received from the transmission circuit 400 to the control circuit 404. The transmission circuit 400 wirelessly communicates with the reception circuit 402.

The control circuit 404 determines whether the temperature detected by the temperature detection circuit 134 is in a range in which the capacitance of the electrolytic capacitor 132 decreases, such as equal to or lower than −20° C. When the temperature detected by the temperature detection circuit 134 is equal to or lower than −20° C., the control circuit 404 turns the MOS-FET 322 on and connects the power-receiving-side capacitors 204 and 406 in parallel. Further, when the temperature detected by the temperature detection circuit 134 is higher than −20° C., the control circuit 404 turns the MOS-FET 322 off and detaches the power-receiving-side capacitor 406 from the power receiving device 2.

When the MOS-FET 322 is turned on, the capacitance of the power-receiving-side capacitor 406 is added to the capacitance of the power-receiving-side capacitor 204 in the power-receiving coil unit 20, and the impedance changes. Accordingly, for example, the resonance frequency of the circuit including the power-transmitting coil unit 18 and the power-receiving coil unit 20 is decreased by $\Delta f_{ol}$ from the resonance frequency $f_{on}$ when the first power transmission is performed, the frequency being indicated in FIG. 8, and becomes $f_{ol}$. In other words, the circuit including the power-transmitting coil unit 18 and the power-receiving coil unit 20 becomes either a resonance circuit with a resonance frequency $f_{on}$ or a resonance circuit with a resonance frequency $f_{ol}$ depending on the on/off state of the MOS-FET 322.

Thus, the control circuit 404 can cause the power-transmitting coil unit 18 to execute the first power transmission by turning the MOS-FET 322 off and can cause the power-transmitting coil unit 18 to execute the second power transmission by turning the MOS-FET 322 on.

Further, the control circuit 102 may transmit a power transmission mode instruction signal in place of a detected-temperature signal to the control circuit 404 through the transmission circuit 400 and the reception circuit 402. The power transmission mode instruction signal is a signal giving an instruction to execute either of the first power transmission and the second power transmission. In this case, the control circuit 102 (i) determines, from the temperature of the electrolytic capacitor 132 detected by the temperature detection circuit 134, which of an instruction to execute the first power transmission and an instruction to execute the second power transmission should be given and (ii) supplies a power transmission mode instruction signal indicating the determination result to the transmission circuit 400.

The control circuit 404 turns the MOS-FET 322 off when a power transmission mode instruction signal gives an instruction to execute the first power transmission and turns the MOS-FET 322 on when a power transmission mode instruction signal gives an instruction to execute the second power transmission. Thus, a determination entity determining whether to execute the first power transmission or the second power transmission may be the control circuit 102 included in the power transmission device 10 or the control circuit 404 included in the power receiving device 2.

Further, the impedance adjustment circuit may be placed anywhere in the power receiving device 2. The impedance adjustment circuit may be placed in the power-receiving coil unit 20, may be placed in the rectifier circuit 24, or may be placed at another position.

Embodiment 6

Figure 13:
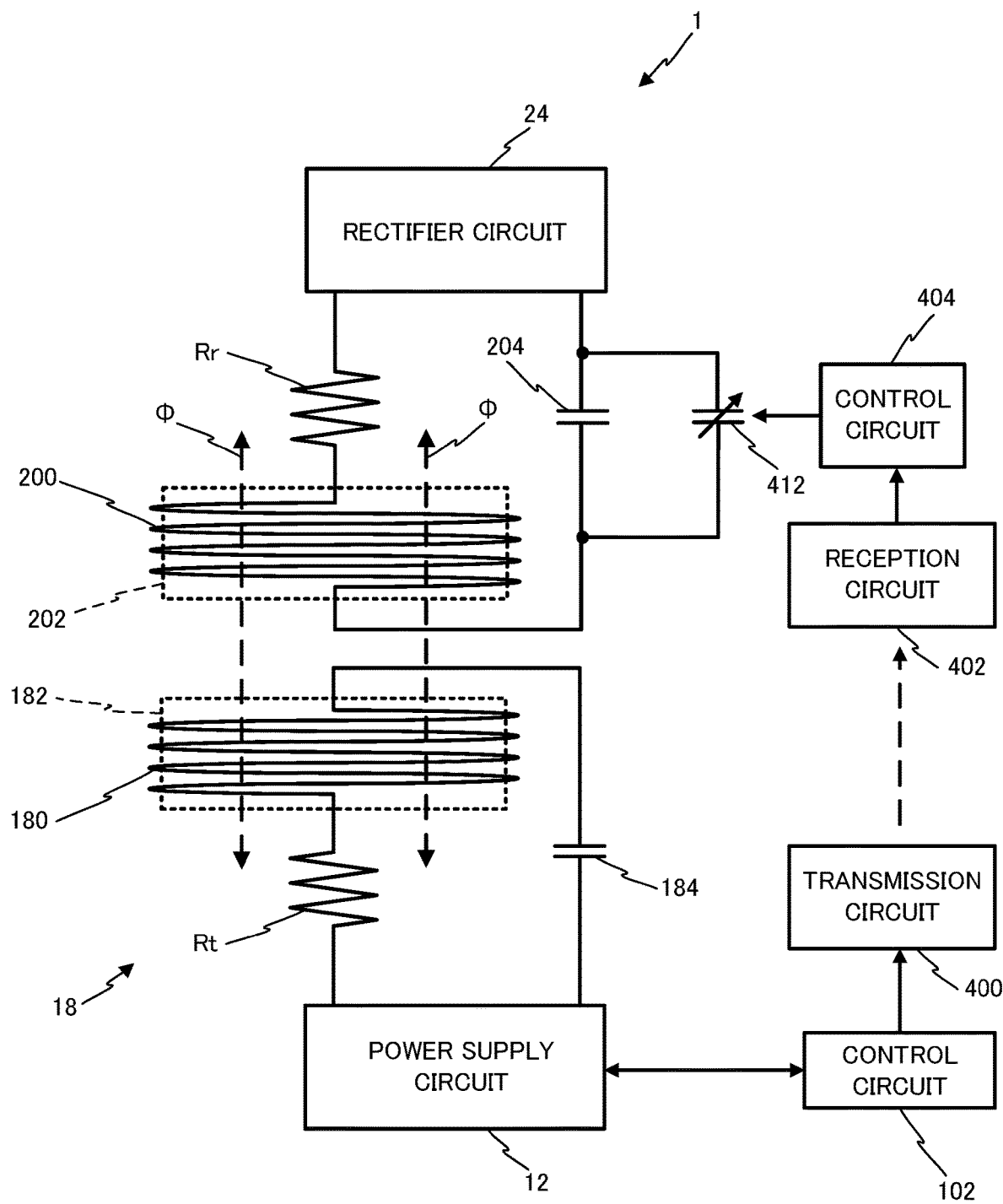
FIG. 13 is a diagram illustrating a configuration of a power transmission system according to Embodiment 6 of the present disclosure.

An example of changing the impedance of the power-receiving-side circuit by use of a circuit connecting the power-receiving-side capacitor 406 to the MOS-FET 322 in series has been described in Embodiment 5. The technique of changing the impedance of the power-receiving-side circuit is not limited to the example. For example, the impedance adjustment circuit including the power-receiving-side capacitor 406 and the MOS-FET 322 as illustrated in FIG. 12 may be replaced by an impedance adjustment circuit configured with a variable capacitance power-receiving-side capacitor 412 a capacitance value of which changes in accordance with control by the control circuit 404, as illustrated in FIG. 13.

The control circuit 404 switches the capacitance of the power-receiving-side capacitor 412 between capacitance for the first power transmission and capacitance for the second power transmission, based on a detected-temperature signal or a power transmission mode instruction signal received from the reception circuit 402. The configuration can change power-receiving-side reactance similarly to Embodiment 5.

Further, the resonance frequency may be changed by adjusting the impedance by a technique such as replacing the power-receiving-side capacitor 204 with a variable capacitor and changing the capacitance of the variable capacitor.

Further, the resonance frequency may be changed by adjusting the impedance by changing the inductance of the power-receiving coil 200 by adjusting a relative position between the power-receiving coil 200 and the magnetic plate 202.

Further, similarly to Embodiment 4 illustrated in FIG. 11, the impedance of the power receiving device 2 may be adjusted by switching between a plurality of capacitors having different capacitance values to be connected in the power receiving device 2.

Further, the impedance adjustment circuit may be placed anywhere in the power receiving device 2. The impedance adjustment circuit may be placed in the power-receiving coil unit 20, may be placed in the rectifier circuit 24, or may be placed at another position.

Embodiment 7

Examples of switching between the first power transmission and the second power transmission to be executed by adjusting the impedance of a circuit including a power-transmitting coil unit and a power-receiving coil unit by electric control have been described in Embodiments 1 to 6. The present disclosure is not limited to the above, and the second power transmission may be executed by reducing power supply from a power-transmitting coil unit to a power-receiving coil unit by weakening magnetic coupling between the power-transmitting coil unit and the power-receiving coil unit.

Figure 14:
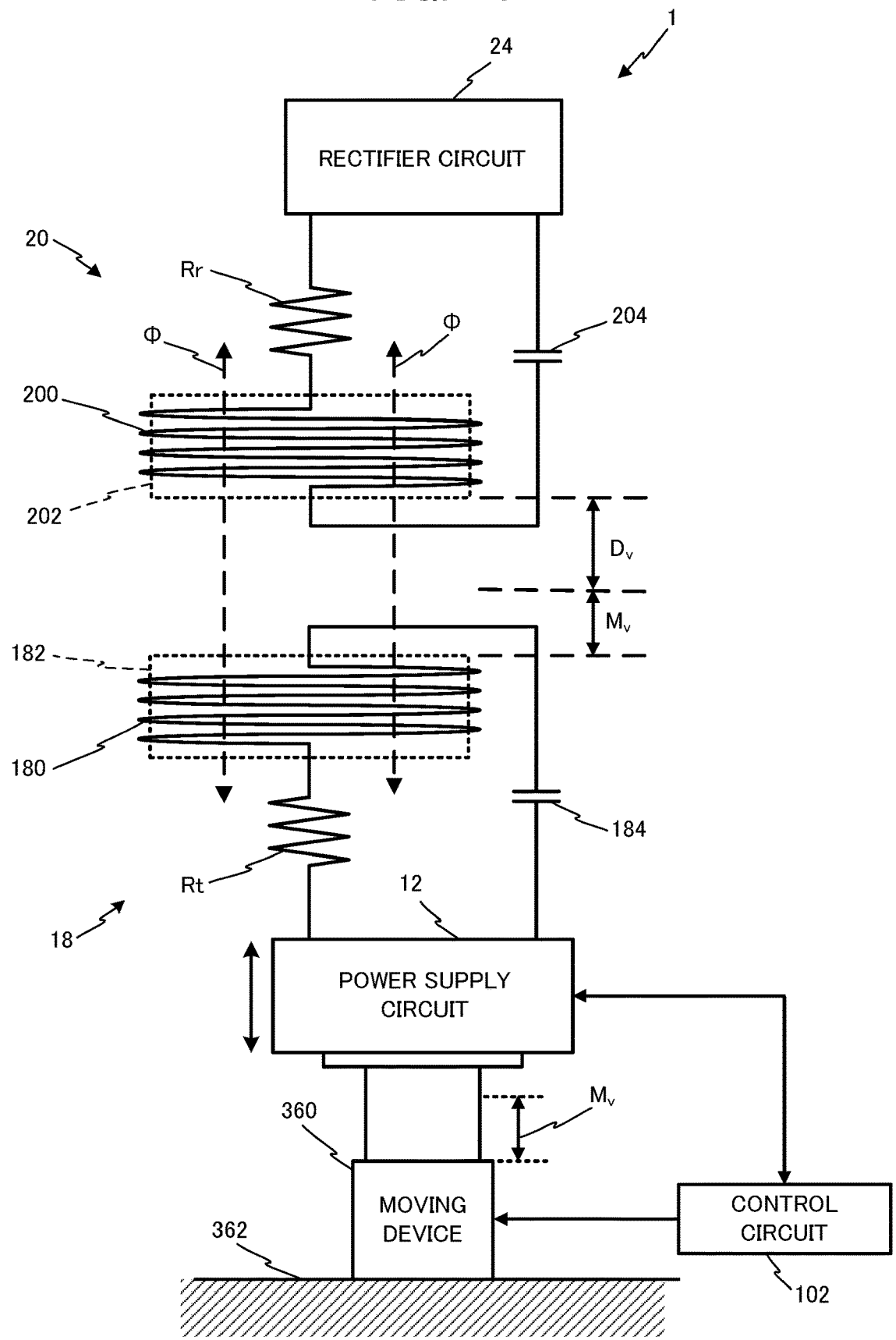
FIG. 14 is a diagram illustrating a configuration of a power transmission system according to Embodiment 7 of the present disclosure.

A technique of switching between the first power transmission and the second power transmission by adjusting a coupling coefficient k indicating a degree of magnetic coupling between a power-transmitting coil unit 18 and a power-receiving coil unit 20 will be described below in the present embodiment. FIG. 14 is a diagram illustrating a configuration of a power transmission system 1 capable of changing a relative positional relation between the power-transmitting coil unit 18 and the power-receiving coil unit 20. In the power transmission system 1 illustrated in FIG. 14, a power supply circuit 12 and the power-transmitting coil unit 18 are placed on a moving device 360.

The moving device 360 is configured with an electric jack or the like and is installed on a floor surface 362 or the like. The moving device 360 moves positions of the power supply circuit 12 and the power-transmitting coil unit 18 in a vertical direction in accordance with control by a control circuit 102 and changes the distance between the power-transmitting coil unit 18 and the power-receiving coil unit 20 between a distance $D_v$ for the first power transmission and a distance $(D_v+\Delta f_v)$ for the second power transmission. When the distance between the end of a power-transmitting coil 180 in the power-transmitting coil unit 18 and the end of a power-receiving coil 200 in the power-receiving coil unit 20 in the vertical direction is increased from the distance $D_v$ to the distance $(D_v+\Delta f_v)$ in a direction of magnetic flux 1, the value of the coupling coefficient k between the power-transmitting coil 180 and the power-receiving coil 200 decreases. The moving device 360 is an example of a positional relation adjustment device in the present disclosure.

As the distance between the power-transmitting coil unit 18 and the power-receiving coil unit 20 increases, the value of the coupling coefficient k indicating strength of magnetic coupling between the power-transmitting coil unit 18 and the power-receiving coil unit 20 decreases. When the coupling coefficient k decreases, a counter electromotive force in the power-receiving coil 220 decreases even when the power supply circuit 12 transmits electric power under the same condition, and efficient power transmission cannot be performed.

Accordingly, by setting the distance between the power-transmitting coil unit 18 and the power-receiving coil unit 20 to $D_v$, the control circuit 102 can cause the power-transmitting coil unit 18 to execute the first power transmission.

Further, by increasing the distance between the power-transmitting coil unit 18 and the power-receiving coil unit 20 to $(D_v+M_v)$, the control circuit 102 can cause the power-transmitting coil unit 18 to execute the second power transmission.

Note that control for switching between the first power transmission and the second power transmission by the control circuit 102 is similar to the control described above with reference to FIG. 5. Further, the power-transmitting coil unit 18 does not necessarily need to be moved together with the power supply circuit 12, and the moving device 360 may move only the power-transmitting coil unit 18 as long as the position of the power-transmitting coil unit 18 can be changed independently of other components in the power transmission system 1.

Further, the configuration itself for moving the power-transmitting coil unit 18 may be any configuration without being limited to the electric jack.

Embodiment 8

Figure 15:
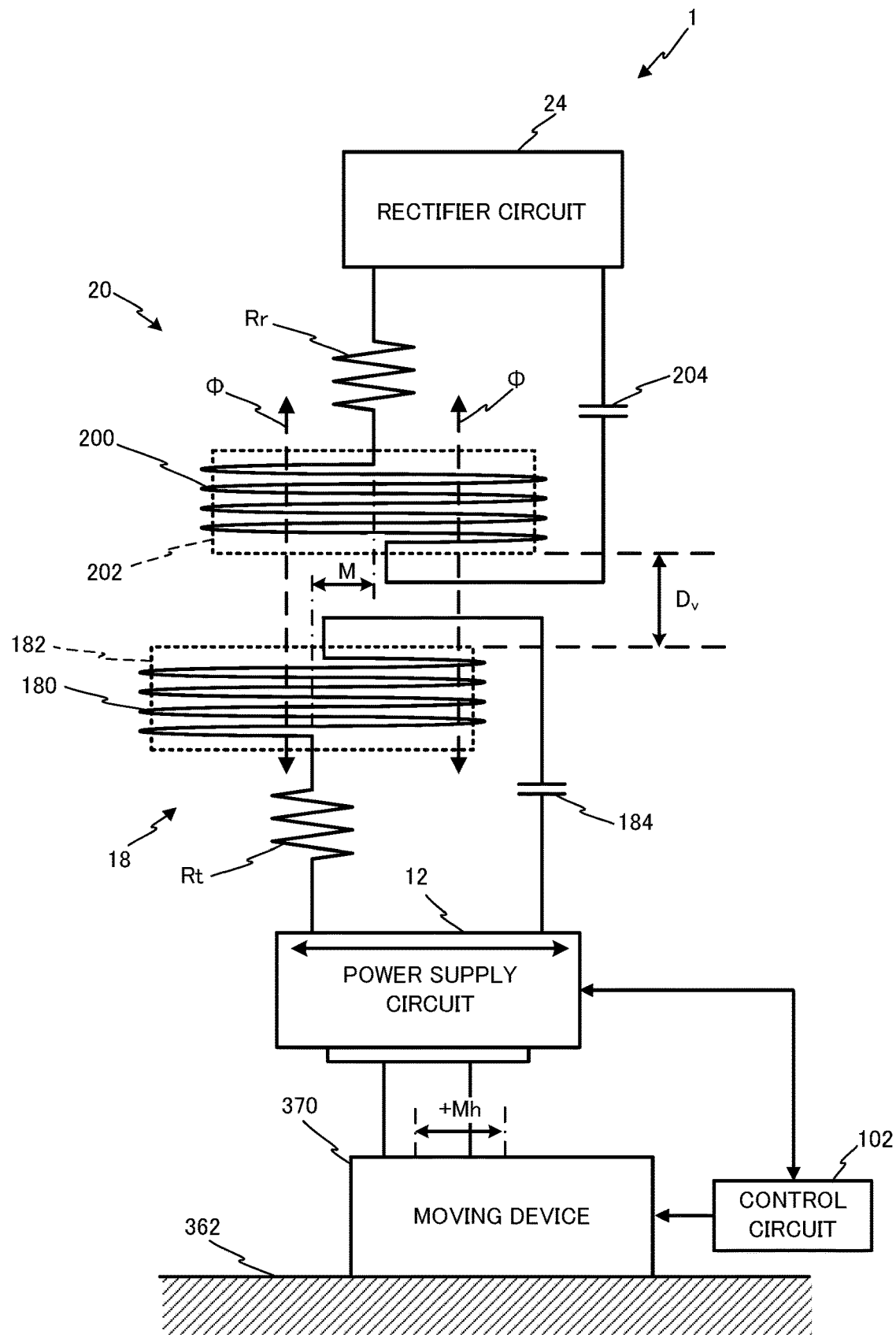
FIG. 15 is a diagram illustrating a configuration of a power transmission system according to Embodiment 8 of the present disclosure.

A configuration for changing a coupling coefficient k between a power-transmitting coil unit 18 and a power-receiving coil unit 20 is not limited to the configuration described in Embodiment 7. A technique of changing the coupling coefficient k by moving positions of a power supply circuit 12 and the power-transmitting coil unit 18 in a direction perpendicular to magnetic flux Φ will be described in the present embodiment. As illustrated in FIG. 15, a power-transmitting coil unit 18 and a power supply circuit 12 according to the present embodiment are placed on a moving device 370.

The moving device 370 is configured with a horizontally moving table, is installed on a floor surface 362 or the like, and is slidable in a horizontal direction parallel with the surface of the page. The moving device 370 moves the positions of the power supply circuit 12 and the power-transmitting coil unit 18 in a direction perpendicular to the magnetic flux Φ by 0 to a maximum of $M_h$ in accordance with control by a control circuit 102. Further, in the present embodiment, the power-transmitting coil unit 18 and the power-receiving coil unit 20 are in a state of directly facing each other when an amount of movement is 0, and the distance in a vertical direction between the power-transmitting coil unit 18 and the power-receiving coil unit 20 is fixed to $D_v$.

When a distance M between the center of a power-transmitting coil 180 in the power-transmitting coil unit 18 and the center of a power-receiving coil 200 in the power-receiving coil unit 20 is 0, a coupling coefficient k between the power-transmitting coil 180 and the power-receiving coil 200 is maximized. On the other hand, as the distance M between the center of the power-transmitting coil 180 and the center of the power-receiving coil 200 increases, the value of the coupling coefficient k decreases. As described in Embodiment 7, as the coupling coefficient k decreases, a counter electromotive force in the power-receiving coil unit 20 decreases, and efficient power transmission cannot be performed.

By setting the distance M between the center of the power-transmitting coil 180 in the power-transmitting coil unit 18 and the center of the power-receiving coil 200 in the power-receiving coil unit 20 to 0, the control circuit 102 maximizes the coupling coefficient k between the power-transmitting coil 180 and the power-receiving coil 200 and causes the power-transmitting coil unit 18 to execute the first power transmission at a frequency $f_d$. On the other hand, by setting the distance M to a predetermined value greater than 0, the control circuit 102 decreases the coupling coefficient k and causes the power-transmitting coil unit 18 to execute the second power transmission at the frequency $f_d$.

Note that control for switching between the first power transmission and the second power transmission by the control circuit 102 according to the present embodiment is similar to the control described above with reference to FIG. 5. Further, the power-transmitting coil unit 18 does not need to be moved together with the power supply circuit 12, and the moving device 370 may move only the power-transmitting coil unit 18 as long as the position of the power-transmitting coil unit 18 can be changed independently of other components in the power transmission system 1.

Further, the configuration itself for horizontally moving the power-transmitting coil unit 18 may be any configuration without being limited to the horizontally moving table.

Embodiment 9

While techniques of changing the coupling coefficient k between the power-transmitting coil unit 18 and the power-receiving coil unit 20 by changing the distance between the power-transmitting coil unit 18 and the power-receiving coil unit 20 have been described in Embodiments 7 and 8, another technique may be employed. For example, the coupling coefficient k may be controlled by changing the parallelism between the power-transmitting coil 180 and the power-receiving coil 220.

Figure 16:
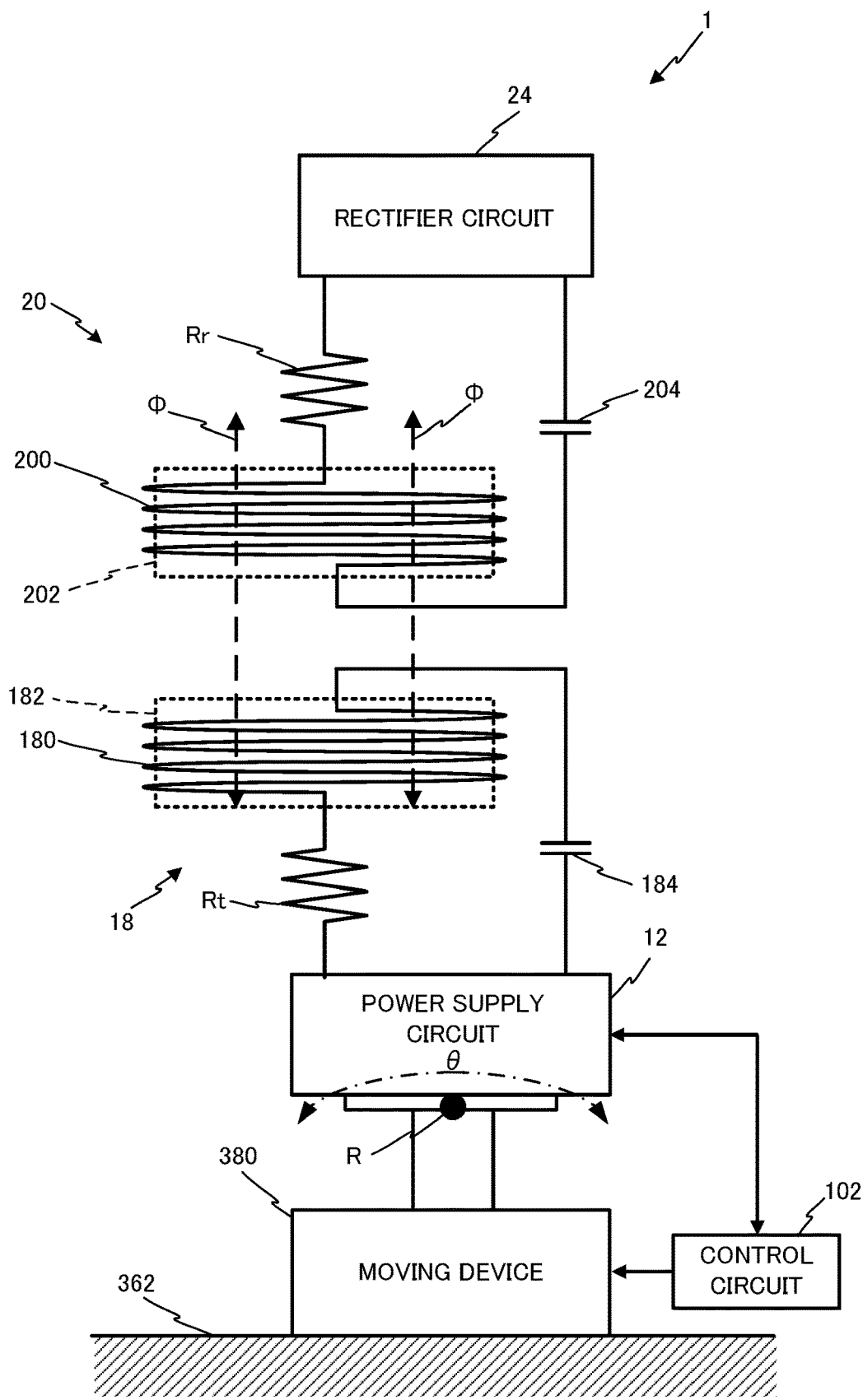
FIG. 16 is a diagram illustrating a configuration of a power transmission system according to Embodiment 9 of the present disclosure.

For example, as illustrated in FIG. 16, a tilt angle of a power-transmitting coil unit 18 and a power supply circuit 12 placed on a stage may be changed by making a supporting shaft of a moving device 380 rotatable around an axis by any angle θ. In this case, for example, by controlling the moving device 380 in such a way that the stage is horizontal during execution of the first power transmission, the control circuit 102 makes the central axis of a power-transmitting coil 180 parallel with the central axis of a power-receiving coil 220 and increases the coupling coefficient k. Further, by tilting the stage during execution of the second power transmission, the control circuit 102 makes the central axis of the power-transmitting coil 180 tilted relative to the central axis of the power-receiving coil 220 and decreases the coupling coefficient k.

Note that control for switching between the first power transmission and the second power transmission by the control circuit 102 according to the present embodiment is similar to the control described above with reference to FIG. 5. Further, the power-transmitting coil unit 18 and the power supply circuit 12 do not need to be moved integrally, and the moving device 380 may swing only the power-transmitting coil unit 18 as long as the position of the power-transmitting coil unit 18 can be changed independently of the power supply circuit 12.

The technique of changing the tilt angle of the power-transmitting coil unit 18 may be any technique without being limited to swinging.

Embodiment 10

Examples of manipulating the power-transmitting coil unit 18 for making the second power transmission executable have been described in aforementioned Embodiments 7 to 9. The present disclosure is not limited to the above. For example, the second power transmission may be enabled by manipulating the power-receiving coil unit 20 and the rectifier circuit 24.

Figure 17:
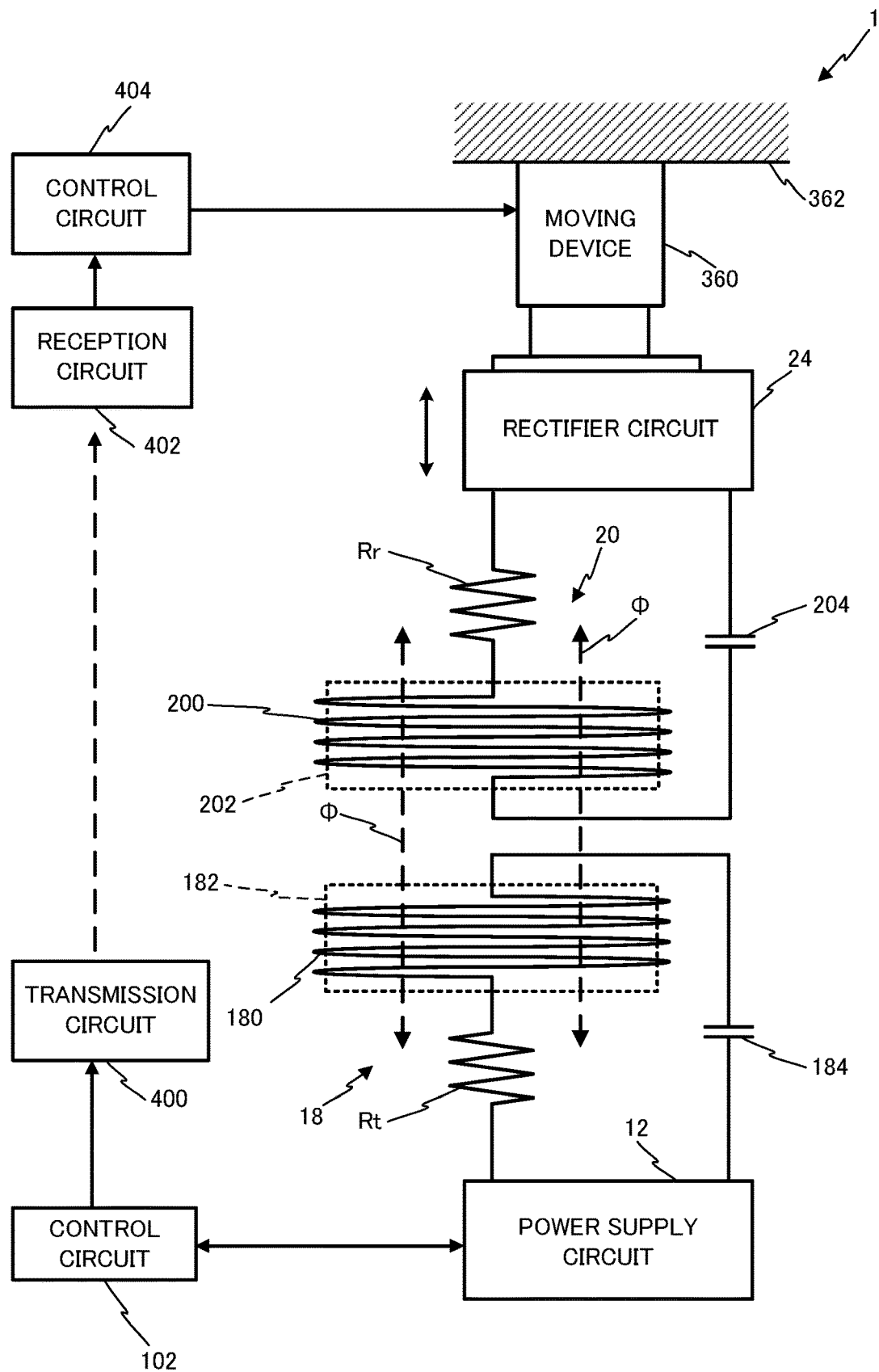
FIG. 17 is a diagram illustrating a configuration of a power transmission system according to Embodiment 10 of the present disclosure.

FIG. 17 illustrates a configuration allowing a power-receiving coil unit 20 and a rectifier circuit 24 to be moved in a vertical direction by the moving device 360 illustrated in FIG. 14. The moving device 360 supports the power-receiving coil unit 20 and the rectifier circuit 24, moves the unit and the circuit in the vertical direction in accordance with control by a control circuit 404, and controls a coupling coefficient k between a power-transmitting coil unit 18 and the power-receiving coil unit 20.

As described in Embodiment 5, a control circuit 102 transmits a detected-temperature signal or a power transmission mode instruction signal to a control circuit 404 through a transmission circuit 400 and a reception circuit 402. In accordance with information indicated by the detected-temperature signal or the power transmission mode instruction signal, the control circuit 404 controls the moving device 360 and causes the power-receiving coil unit 20 and the rectifier circuit 24 to move in the vertical direction. The control circuit 102 controls a power supply circuit 12 in such a way as to execute the second power transmission in a state of the coupling coefficient k being relatively small and execute the first power transmission in a state of the coupling coefficient k being relatively large.

Note that control for switching between the first power transmission and the second power transmission is similar to the control described above with reference to FIG. 5. Further, the power-receiving coil unit 20 and the rectifier circuit 24 do not need to be moved integrally, and the moving device 360 may move only the power-receiving coil unit 20 as long as the position of the power-receiving coil unit 20 can be changed independently of the rectifier circuit 24.

Further, the technique of moving the power-receiving coil unit 20 may be any technique without limitation.

Embodiment 11

Figure 18:
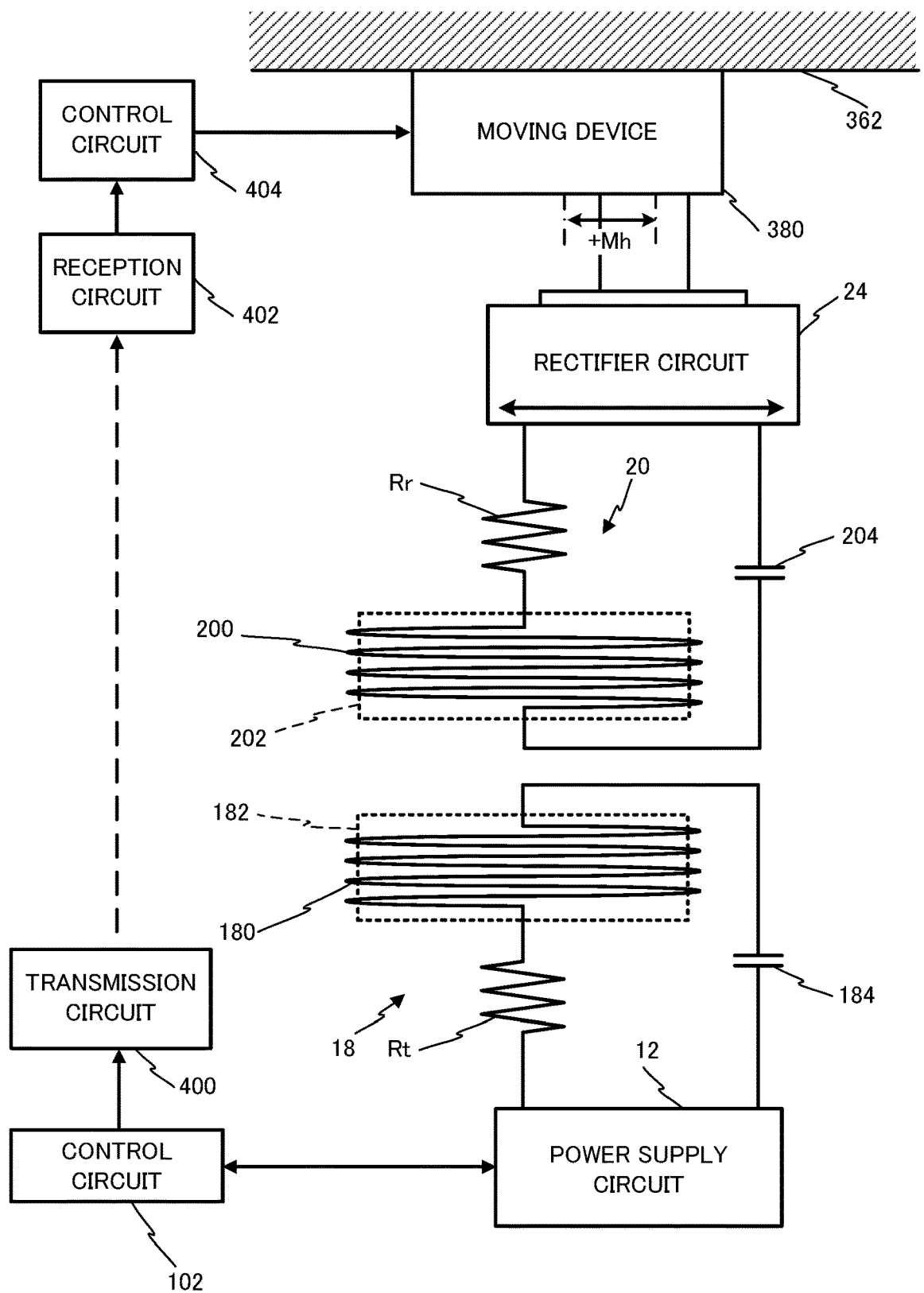
FIG. 18 is a diagram illustrating a configuration of a power transmission system according to Embodiment 11 of the present disclosure.

A configuration enabling movement of the power-receiving coil unit 20 and the rectifier circuit 24 in a vertical direction by the moving device 360 has been described in Embodiment 10. An example of enabling movement of a power-receiving coil unit 20 and a rectifier circuit 24 in a horizontal direction by the moving device 370 illustrated in FIG. 15 will be described with reference to FIG. 18 in the present embodiment.

The moving device 370 supports the power-receiving coil unit 20 and the rectifier circuit 24, moves the unit and the circuit in the horizontal direction in accordance with control from a control circuit 404, and controls a coupling coefficient k between a power-transmitting coil unit 18 and the power-receiving coil unit 20. As described in Embodiment 10, the control circuit 404 can receive a detected-temperature signal or a power transmission mode instruction signal from a control circuit 102 through a transmission circuit 400 and a reception circuit 402. In accordance with information indicated by the detected-temperature signal or the power transmission mode instruction signal, the control circuit 404 moves the power-receiving coil unit 20 and the rectifier circuit 24 in the horizontal direction. The control circuit 102 controls a power supply circuit 12 in such a way as to execute the second power transmission in a state of the coupling coefficient k being relatively small and execute the first power transmission in a state of the coupling coefficient k being relatively large.

Note that control for switching between the first power transmission and the second power transmission is similar to the control described above with reference to FIG. 5. Further, the power-receiving coil unit 20 and the rectifier circuit 24 do not need to be moved integrally, and the moving device 370 may move only the power-receiving coil unit 20 as long as the position of the power-receiving coil unit 20 can be changed independently of the rectifier circuit 24.

Further, the technique of sliding the power-receiving coil unit 20 may be any technique without limitation.

Further, similarly to Embodiment 9, the first power transmission and the second power transmission may be executed by adjusting the coupling coefficient k between the power-transmitting coil unit 18 and the power-receiving coil unit 20 by adjusting the tilt angle of the power-receiving coil unit 20.

The moving devices 360, 370, and 380 are examples of a positional relation adjustment device adjusting a relative positional relation between the power-transmitting coil 180 and the power-receiving coil 220 and have only to be capable of singly or compositely changing a position in a vertical direction, a position in a horizontal direction, and a tilt angle of either one or both of the power-transmitting coil and the power-receiving coil. Further, the control circuits 102 and 104 control the positional relation adjustment device in such a way that magnetic coupling between the power-transmitting coil and the power-receiving coil is weaker during execution of the second power transmission than during execution of the first power transmission.

Furthermore, the electric control illustrated in Embodiments 1 to 6 may be performed in combination with the mechanical control illustrated in Embodiments 7 to 11.

Modified Example

In a case of an electric vehicle 8 returning from outside, it is efficient to start the second power transmission at a point when the electric vehicle 8 approaches a parking position and start the first power transmission at a point when the electric vehicle 8 is parked at a predetermined position. When such a configuration is provided, for example, a detection device detecting that a garage shutter is opened or the electric vehicle 8 is approaching and supplying a charging start instruction signal to a control circuit 102 is placed. In response to receiving the charging start instruction signal, the control circuit 102 starts processing of causing a power supply circuit 12 to supply electric power at a resonance frequency $f_d$ of a circuit including a power-transmitting coil unit 18 and a power-receiving coil unit 20 to the power-transmitting coil unit 18. However, the power-transmitting coil unit 18 is not facing the power-receiving coil unit 20 in this stage, and therefore the power-transmitting coil unit 18 is not in a resonant state; and the second power transmission is started and the temperature of a circuit part and the like are raised. Subsequently, by the electric vehicle 8 being parked or stopped at the predetermined position, the resonance frequency of the circuit including the power-transmitting coil unit 18 and the power-receiving coil unit 20 nearly matches the frequency $f_d$, and an automatic changeover to the first power transmission is performed. The configuration enables efficient charging of a storage battery 80 in the electric vehicle 8 by electric power with a small number of ripples.

In the above description, power transmission efficiency is intentionally decreased during execution of the second power transmission compared with during execution of the first power transmission in such a way that AC power received by the power receiving device 2 in the second power transmission is less than AC power received by the power receiving device 2 in the first power transmission. The AC power received by the power receiving device 2 in the second power transmission may be zero. Making an amount of electric power transmitted from the power-transmitting coil unit 18 to the power-receiving coil unit 20 zero in the second power transmission can be achieved by, for example, changing a frequency of AC power, impedance, and a coupling coefficient in such a way that a counter electromotive force induced in the power-receiving coil 200 is equal to or less than the voltage of the storage battery 80. At this time, the storage battery 80 being a load has high impedance, and current is not supplied from the power receiving device 2 to the storage battery 80; and therefore AC power received by the power receiving device 2 becomes zero. On the other hand, when levels of ripples and noise contained in electric power received by the power receiving device 2 during execution of the second power transmission are within allowable ranges, an amount of electric power transmitted from the power-transmitting coil unit 18 to the power-receiving coil unit 20 in the second power transmission may not need to be zero.

While an example of using a MOS-FET as a switch has been described above, a switch configured with another semiconductor element may be used for either one or both of an on/off switch and a changeover switch. Further, a switch other than a semiconductor switch may be used.

While an electrolytic capacitor has been illustrated as a member requiring a temperature rise in the above description, a member requiring a temperature rise may be any electric or electronic part or any mechanical part as long as the part cannot sufficiently exhibit a function thereof when the temperature is low.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A power transmission device wirelessly transmitting electric power to a power receiving device including a power-receiving coil equipped on a moving body, the power transmission device comprising:
    a power-transmitting coil unit including a power-transmitting coil and transmitting AC power to the power receiving device; and
    a power supply circuit supplying AC power to the power-transmitting coil,
    wherein the power-transmitting coil unit executes first power transmission and second power transmission in which AC power received by the power receiving device is less than the AC power in the first power transmission and executes the second power transmission before executing the first power transmission.

2. The power transmission device according to claim 1, wherein
    the power-transmitting coil unit includes a power-transmitting-side capacitor being connected to the power-transmitting coil and constituting a power-transmitting-side circuit, and
    the power transmission device further comprises a control circuit controlling the power supply circuit in such a way that a frequency of the AC power in the first power transmission and a frequency of the AC power in the second power transmission are different from each other.

3. The power transmission device according to claim 1, wherein
    the power-transmitting coil unit includes a power-transmitting-side capacitor being connected to the power-transmitting coil and constituting a power-transmitting-side circuit, and
    the power transmission device further comprises:
        an impedance adjustment circuit adjusting impedance of the power-transmitting-side circuit; and
        a control circuit controlling the impedance adjustment circuit in such a way that impedance of the power-transmitting-side circuit in the first power transmission and impedance of the power-transmitting-side circuit in the second power transmission are different from each other.

4. The power transmission device according to claim 1, further comprising:
    a positional relation adjustment device adjusting a relative positional relation between the power-transmitting coil and the power-receiving coil; and
    a control circuit controlling the positional relation adjustment device in such a way that magnetic coupling between the power-transmitting coil and the power-receiving coil is weaker during execution of the second power transmission than during execution of the first power transmission.

5. The power transmission device according to claim 4, wherein
    the positional relation adjustment device moves the power-transmitting coil, and
    the control circuit controls a positional relation between the power-transmitting coil and the power-receiving coil by controlling the positional relation adjustment device.

6. The power transmission device according to claim 1, further comprising:
    a member requiring a temperature rise; and
    a temperature detector detecting temperature of the member,
    wherein the power-transmitting coil unit executes the second power transmission when temperature detected by the temperature detector is lower than a predetermined threshold value.

7. The power transmission device according to claim 6, wherein the power-transmitting coil unit executes the first power transmission when temperature detected by the temperature detector is equal to or higher than the threshold value.

8. The power transmission device according to claim 1, wherein the power-transmitting coil unit executes the second power transmission when the moving body is stopped.

9. A power transmission system comprising a power receiving device equipped on a moving body and a power transmission device wirelessly transmitting electric power to the power receiving device, wherein
    the power transmission device includes:
        a power supply circuit supplying AC power to a power-transmitting coil; and
        a power-transmitting coil unit including the power-transmitting coil and transmitting AC power to the power receiving device,
    the power receiving device includes:
        a power-receiving coil unit including a power-receiving coil and receiving AC power; and a rectifier circuit rectifying AC power received by the power-receiving coil unit, and the power-transmitting coil unit executes first power transmission and second power transmission in which AC power received by the power receiving device is less than the AC power in the first power transmission and executes the second power transmission before executing the first power transmission.

10. The power transmission system according to claim 9, further comprising:

at least either one of a power-transmitting-side capacitor constituting a power-transmitting-side circuit along with the power-transmitting coil and a power-receiving-side capacitor constituting a power-receiving-side circuit along with the power-receiving coil; and a control circuit controlling the power supply circuit in such a way that a frequency of AC power in the first power transmission and a frequency of AC power in the second power transmission are different from each other.

11. The power transmission system according to claim 9, wherein the power-transmitting coil unit includes a power-transmitting-side capacitor constituting a power-transmitting-side circuit along with the power-transmitting coil, and the power transmission system further comprises:

an impedance adjustment circuit adjusting impedance of the power-transmitting-side circuit; and a control circuit controlling the impedance adjustment circuit in such a way that impedance of the power-transmitting-side circuit in the first power transmission and impedance of the power-transmitting-side circuit in the second power transmission are different from each other.

12. The power transmission system according to claim 9, wherein the power-receiving coil unit includes a power-receiving-side capacitor constituting a power-receiving-side circuit along with the power-receiving coil, and the power transmission system further comprises:

an impedance adjustment circuit adjusting impedance of the power-receiving-side circuit; and a control circuit controlling the impedance adjustment circuit in such a way that impedance of the power-receiving-side circuit in the first power transmission and impedance of the power-receiving-side circuit in the second power transmission are different from each other.

13. The power transmission system according to claim 9, further comprising:

a positional relation adjustment device adjusting a relative positional relation between the power-transmitting coil and the power-receiving coil; and a control circuit controlling the positional relation adjustment device in such a way that magnetic coupling between the power-transmitting coil and the power-receiving coil is weaker during execution of the second power transmission than during execution of the first power transmission.

14. The power transmission system according to claim 13, wherein the positional relation adjustment device moves the power-transmitting coil, and the control circuit controls a positional relation between the power-transmitting coil and the power-receiving coil by controlling the positional relation adjustment device.

15. The power transmission system according to claim 13, wherein the positional relation adjustment device moves the power-receiving coil, and the control circuit controls a positional relation between the power-transmitting coil and the power-receiving coil by controlling the positional relation adjustment device.

16. The power transmission system according to claim 10, wherein the power transmission device includes the control circuit.

17. The power transmission system according to claim 10, wherein the power receiving device includes the control circuit.

18. The power transmission system according to claim 9, further comprising:

a member requiring a temperature rise; and a temperature detector detecting temperature of the member, wherein the power-transmitting coil unit executes the second power transmission when temperature detected by the temperature detector is lower than a predetermined threshold value.

19. The power transmission system according to claim 18, wherein the power-transmitting coil unit executes the first power transmission when temperature detected by the temperature detector is equal to or higher than the threshold value.

20. The power transmission system according to claim 9, wherein the power-transmitting coil unit executes the second power transmission when the moving body is stopped.

* * * * *